US011611599B2

(12) United States Patent
Jeffery et al.

(10) Patent No.: US 11,611,599 B2
(45) Date of Patent: Mar. 21, 2023

(54) SYSTEM AND METHOD FOR GROUPING PARTICIPANT DEVICES IN A COMMUNICATION ENVIRONMENT

(71) Applicant: Fulcrum Management Solutions Ltd., Rossland (CA)

(72) Inventors: Mark John Jeffery, Rossland (CA); David Anthony MacLeod, Rossland (CA)

(*) Notice: Subject to any disclaimer, the term of this patent is extended or adjusted under 35 U.S.C. 154(b) by 0 days.

(21) Appl. No.: 17/371,161

(22) Filed: Jul. 9, 2021

(65) Prior Publication Data

US 2022/0174100 A1 Jun. 2, 2022

Related U.S. Application Data

(60) Provisional application No. 63/118,819, filed on Nov. 27, 2020.

(51) Int. Cl.
*H04L 65/403* (2022.01)
(52) U.S. Cl.
CPC ................. *H04L 65/403* (2013.01)
(58) Field of Classification Search
CPC .................................................... H04L 65/403

USPC ......................................................... 709/204
See application file for complete search history.

(56) References Cited

U.S. PATENT DOCUMENTS

| | | | | |
|---|---|---|---|---|
| 7,716,284 | B2* | 5/2010 | Andersen | G06Q 10/10 709/200 |
| 8,346,866 | B2* | 1/2013 | Canning | G06Q 10/06 709/204 |
| 2007/0300165 | A1* | 12/2007 | Haveliwala | G06F 3/0482 715/758 |
| 2008/0267095 | A1* | 10/2008 | Sekaran | H04L 12/66 370/260 |
| 2010/0030648 | A1* | 2/2010 | Manolescu | G06Q 30/02 705/14.66 |

* cited by examiner

*Primary Examiner* — Zi Ye
(74) *Attorney, Agent, or Firm* — Marin Patents LLC; Gustavo Marin

(57) ABSTRACT

Systems and methods for computing a distribution pattern of information whereby, as the rating of thought objects in a roundtable exchange proceeds, thought objects that are more highly rated and are therefore more likely to be chosen as subjects for discussion in groups, are more widely distributed to participant devices for rating, and for computing a pattern of assignment whereby each participant device is assigned to a group discussing a subject which that participant device rated highly, within constraints specified by the facilitator.

18 Claims, 17 Drawing Sheets

SYSTEM AND METHOD FOR GROUPING PARTICIPANT DEVICES IN A COMMUNICATION ENVIRONMENT

CROSS-REFERENCE TO RELATED APPLICATIONS

This application claims the benefit of, and priority to U.S. provisional application 63/118,819 titled, "SYSTEM AND METHOD FOR GROUPING PARTICIPANT DEVICES IN A COMMUNICATION ENVIRONMENT" filed on Nov. 27, 2020, the entire specification of which is incorporated herein by reference.

BACKGROUND OF THE INVENTION

Field of the Art

The disclosure relates to the analysis of subjects for discussion associated with electronic documents, and more particularly to the field of automatically assigning a plurality of participant devices to groups for discussion of subjects, based on how highly subjects are rated by participant devices across the plurality of participant devices.

Discussion of the State of the Art

Electronically facilitated conferences or group meetings are often attended by large number of participant devices. Each such conference may have multiple topics scheduled for group discussions and the total number of participant devices may be divided into groups, such that each group is assigned one or more specific subjects to discuss. However, more often than not, a facilitator has little to no information on which participant devices would like to discuss what subjects, and/or how to maximize output of such discussions by assigning appropriate participant devices to subjects based on their interest, expertise, and other such factors.

Further, there may be a limit of the number of breakout groups that can be created in a conference setup, often based on limitations around availability of meeting rooms or electronically facilitated meeting connections, and duration of the conference. In addition, there may be limits on the numbers of participants in each breakout group, often based on the maximum capacity of these meeting rooms or electronically facilitated meeting connections, and the minimum and maximum numbers of participants in each breakout group for optimal inclusion of all participants in the discussions. The facilitator may have little information available pertaining to interests of the participants and their expertise in a particular subject, and therefore may randomly assign participant devices into groups to meet the limits of the number of breakout groups and the numbers of participants in each breakout group, leading to unproductive discussions.

Accordingly, a need in the art exists for a system and method for computing a distribution pattern of information whereby, as the rating of one or more thought objects in a roundtable exchange proceeds, thought objects that are more highly rated and are therefore more likely to be chosen as subjects for discussion in groups, are more widely distributed to participant devices for rating.

What is further needed in the art are systems and methods for computing a pattern of assignment whereby each participant device is assigned to a group discussing a subject which that participant device rated highly, within constraints specified by the facilitator of numbers of groups and numbers of participant devices in each group.

SUMMARY OF THE INVENTION

Accordingly, the inventor has conceived and reduced to practice, in a preferred embodiment of the invention, a system and method for grouping participant devices based on a plurality of rated subjects for discussion.

According to a preferred embodiment of the invention, disclosed are systems and methods for computing a distribution pattern of information whereby, as the rating of thought objects in a roundtable exchange proceeds, thought objects that are more highly rated and are therefore more likely to be chosen as subjects for discussion in groups, are more widely distributed to participant devices for rating, and for computing a pattern of assignment whereby each participant device is assigned to a group discussing a subject which that participant device rated highly, within constraints specified by the facilitator of numbers of groups and numbers of participant devices in each group.

In a preferred embodiment, a system for grouping a plurality of user devices comprises a device grouping computer comprising a memory, a processor, and a plurality of programming instructions, the plurality of programming instructions stored in the memory and when executed by the processor cause the processor to receive, from a facilitator user device, a request to assign a plurality of user devices to one or more groups, receive, from a database, user information associated with each device of the plurality of user devices, the information comprising at least, attributes associated with a corresponding user device of the plurality of user devices, receive one or more thought objects shared by the plurality of user devices.

The device grouping computer then assigns one or more user devices to a first group, of a plurality of groups, the first group associated with one or more subjects associated with at least a portion of the one or more thought objects wherein the plurality of groups is based on parameters, then send details of the first group to a graphical user interface associated with one or more user devices, of the plurality of user devices, the details comprising information associated with the first group.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 1:
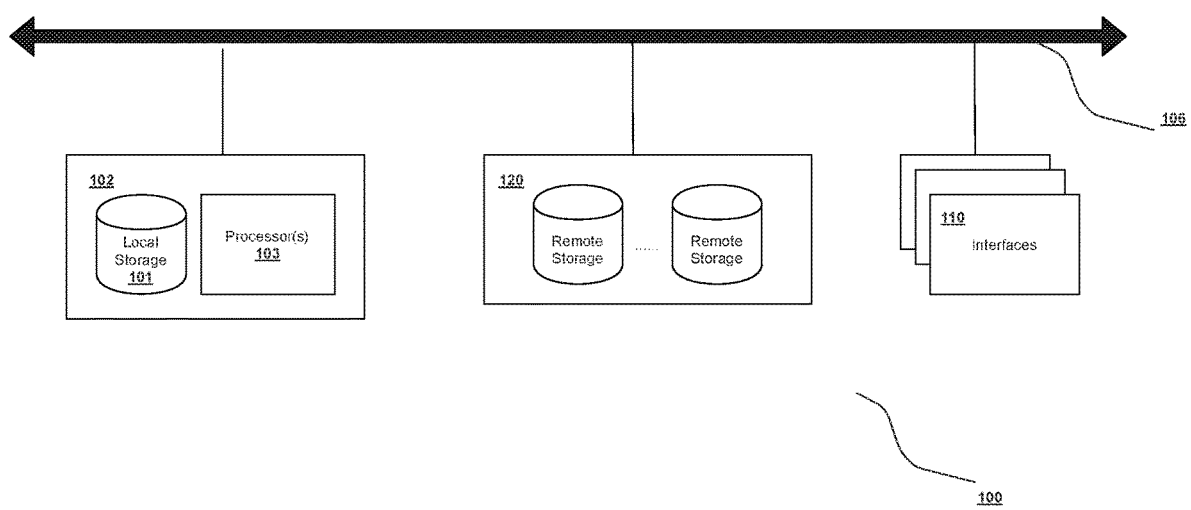
FIG. 1 is a block diagram illustrating an exemplary hardware architecture of a computing device used in an embodiment of the invention.

FIGS. 10A-F is a flow diagram illustrating a method for assigning participant devices to groups, according to an embodiment of the invention.

DETAILED DESCRIPTION

The inventor has conceived, and reduced to practice, a system and method for grouping participant devices based on a plurality of rated subjects for discussion.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may comprise multiple iterations of a technique or multiple instantiations of a mechanism unless noted otherwise. Process descriptions or blocks in figures should be understood as representing modules, segments, or portions of code which comprise one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 comprises one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may comprise an operating system and any appropriate applications software, drivers, and the like.

CPU 102 may comprise one or more processors 103 such as, for example, a processor from one of the Intel, ARM, Qualcomm, and AMD families of microprocessors. In some embodiments, processors 103 may comprise specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may comprise additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may comprise physical ports appropriate for communication with appropriate media. In some cases, they may also comprise an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that comprises a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may comprise non-transitory machine-readable storage media, which, for example, may be configured or designed to store program instructions, state information, and the like for performing various operations described herein. Examples of such non-transitory machine-readable storage media comprise, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions comprise both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
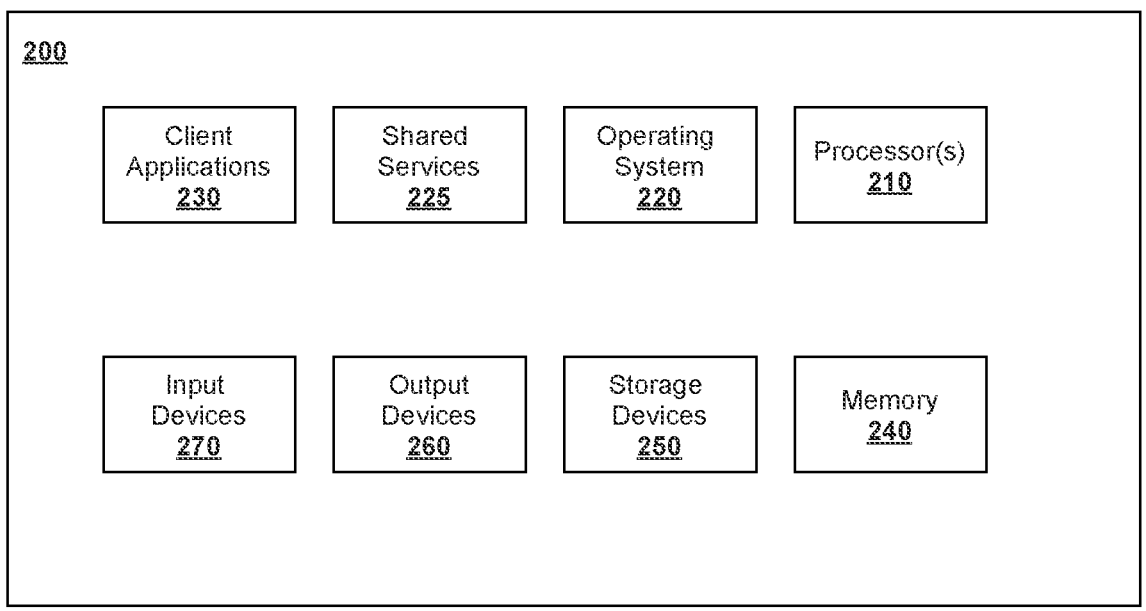
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 comprises processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may comprise for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 comprise flash memory, magnetic hard drive, CD-ROM, and/or the like.

Figure 3:
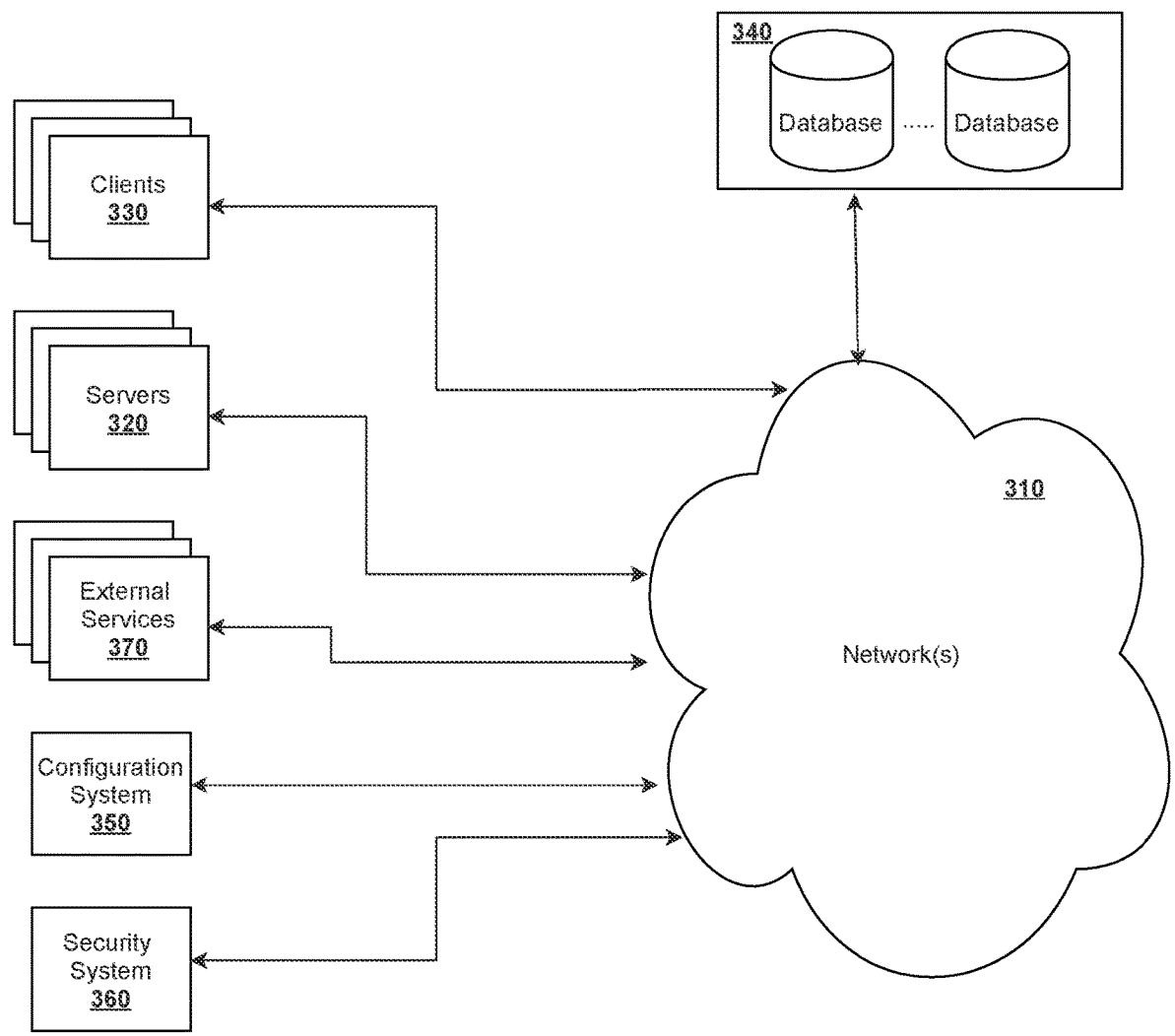
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
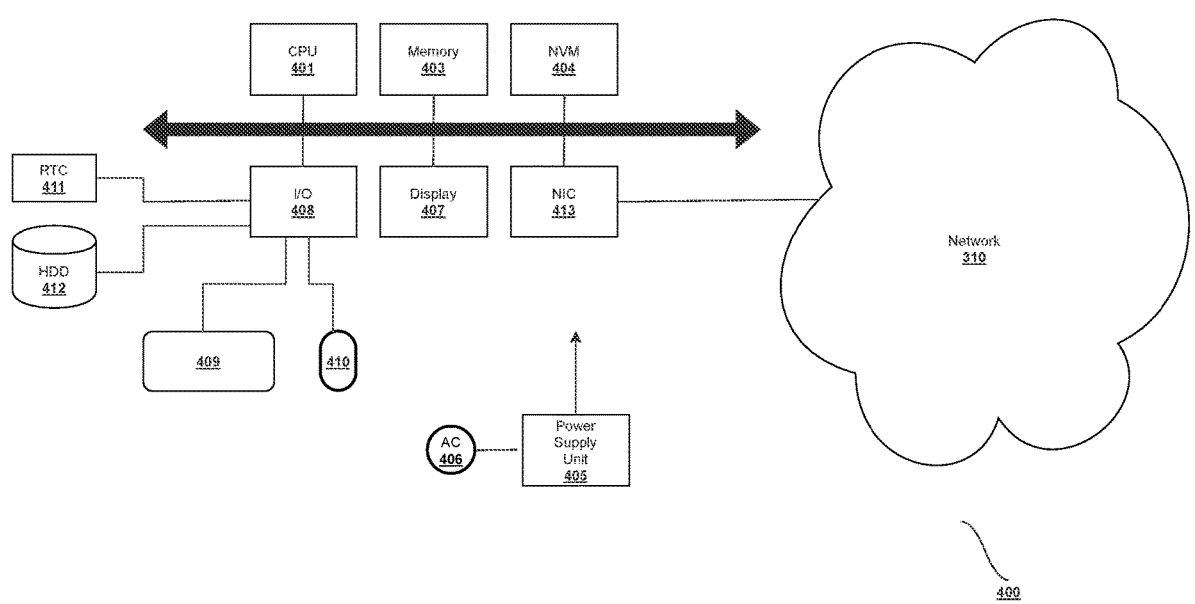
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5A:
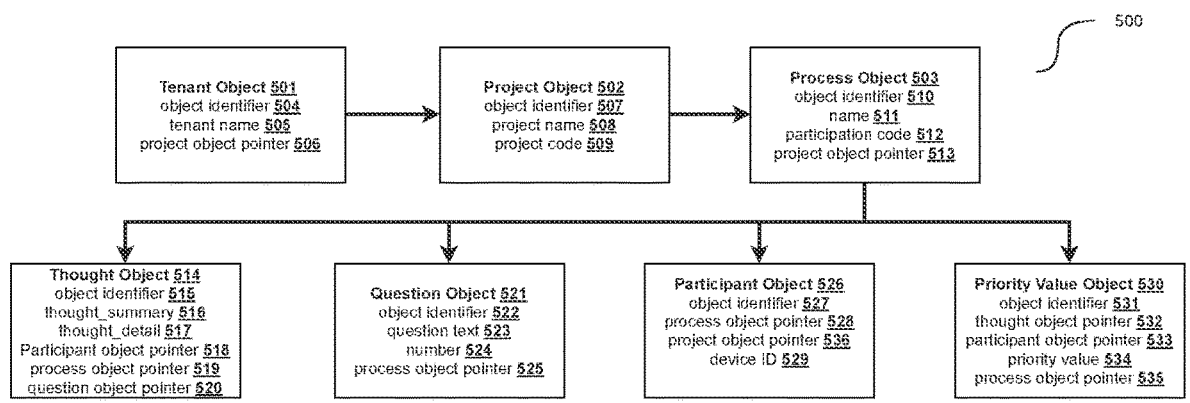
FIG. 5A illustrates a plurality of objects and an exemplary conceptual architecture of a thought object selection computer, according to a preferred embodiment of the invention.

FIG. 5A is a plurality of objects used for thought object filtering and selection, according to a preferred embodiment of the invention. According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example PostgreSQL.

Accordingly, it can be appreciated that an understanding of a plurality of priority values received from a plurality of participant devices 561 provides a means for large scale involvement of users via devices 560 in a networked environment to participate in a quantitative fashion to evaluate thoughts that require an understanding of interest regardless of device location, temporal displacement (i.e. when the respondents responded), psychology (willingness to provide responses in an open forum, or requirement for anonymity), and the like. An interest categorization may represent a collective understanding of what may be most important to at least a portion of a group of users associated with devices 560, for example, across dispersed groups such that understanding of concepts and perspective using accurate priority-based indicators from a plurality of participant devices 561 by a plurality of users.

Tenant object 501 may be a plurality of programming instructions stored in memory 240 that when executed by one or more processors 210 describe a tenant of system 540, that is, a configured entity that may execute a plurality of projects described by one or more associated project objects 502 for analysis of interest for a plurality of priority values received from a plurality of participant devices 561 associated with one or more thought objects 514. Accordingly, one or more project objects 502, that are associated with the tenant object 501, are connected by project object pointer 506. In a preferred embodiment, tenant object 501 may comprise: an object identifier 504 whereby each instantiation of tenant object 501 may be referred to uniquely within the system 540; tenant name 505 may be a text description of the instant tenant object 501; project object pointer 506 (described above) comprises one or more pointers to one or more project objects 502. Said differently, system 540 may configure multiple tenant objects 501 whereby each tenant object 501 may be associated with a plurality of project objects 502 whereby each associated project object 502 is associated with a plurality of other objects 500 (depicted in FIG. 5) to enable analysis of qualitative patterns for a plurality of priority values received from a plurality of participant devices 561. It should be appreciated that participant devices 561 may be at least a portion of devices 560. In a preferred embodiment, participant devices 561 may be devices that, through network 310, provided responses to, for example, a question object 521 and/or thought objects 514. In some embodiments, facilitator devices 562 (referring to FIG. 5B) may be considered participant devices 560.

Figure 5B:
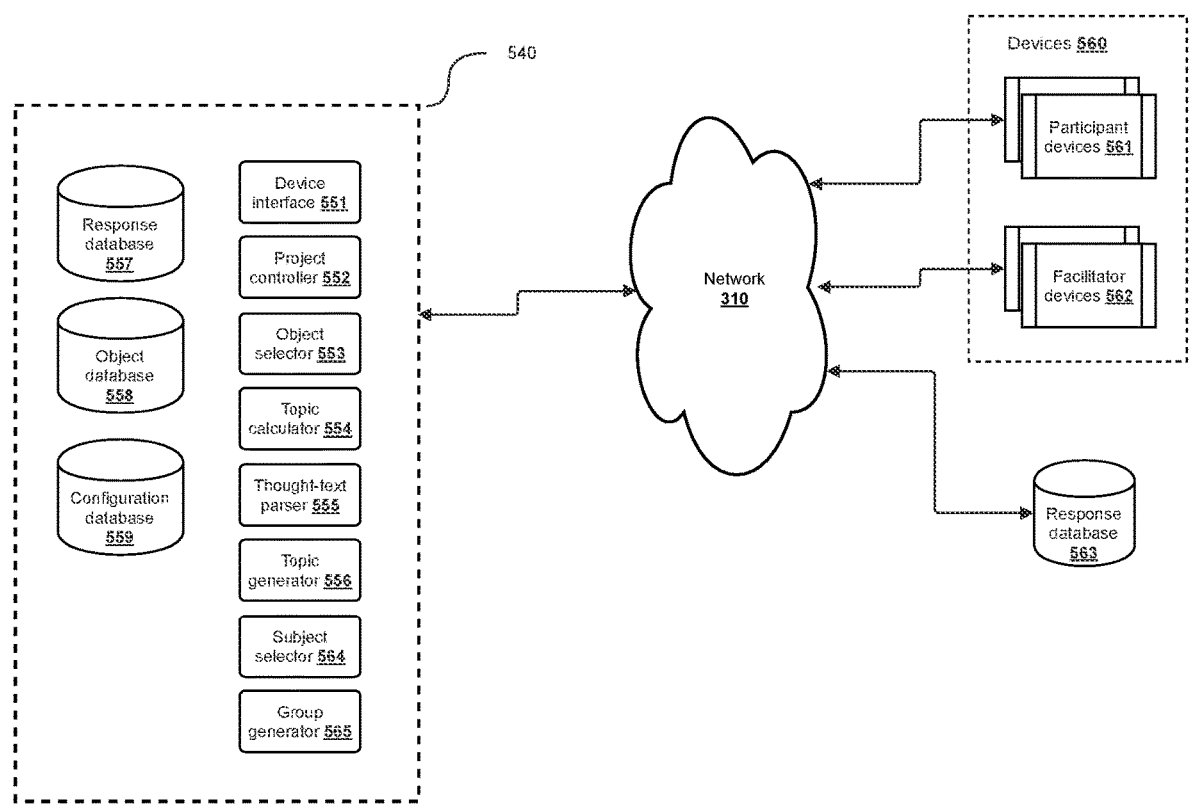
FIG. 5B is a block diagram illustrating an exemplary conceptual architecture of a thought object selection computer, according to a preferred embodiment of the invention.

Project object 502 may be a plurality of programming instructions stored in memory 240 that when executed by processors 210 describe a project for an analysis of qualitative patterns for a plurality of priority values received from a plurality of participant devices 561 based on one or more thought objects 514 whereby a project may be a planned collaborative executions of methods described herein utilizing one or more specially programmed components 540 (referring to FIG. 5B). Project object 502 may comprise: object identifier 507 which may be a globally unambiguous persistent identifier representing an instance of project object 502; project name 508 may be textual description of the instance of the project object 502; project code 509 may be unique identifier associated with a project object 502. Thought object 514 may be a plurality of programming instructions stored in memory 240 that when executed by processors 210 comprise an arrangement of information in the form of ideas received from a device 560 whereby an analysis of qualitative patterns for a plurality of priority values received in response to the arrangement of information from a plurality of participant devices 560. Thought object 514 may comprise: object identifier 515 which may be a globally unambiguous persistent identifier representing an instance of thought object 514; thought_summary 516 may be an arrangement of information corresponding to a qualitative response from a device 560 to another arrangement of information in the form of an open-ended question from, for example, a question object 521; thought_detail 517 may be an additional arrangement of information corresponding to an additional qualitative response from a device 560, for example, an explanation of the importance of the qualitative response represented by thought_summary 516; participant object pointer 518 is a pointer to a participant object 526 who shared the instant thought object 514; process object pointer 519 may be a pointer to an associated process object 503; question object pointer 520 may be a pointer to an associated question object 521 to, for example, have access to the question object 521 through its memory address instead of a new object being created on a stack.

Question object 521 may be a plurality of programming instructions stored in memory 240 that when executed by processors 210 comprise details around the associated arrangement of information associated with a corresponding an open-ended question by, for example, as configured by a facilitator device 562, the arrangement of information being a point of origination for which a plurality of thought objects 514 result, are distributed by project controller 552, and for which a plurality of priority value responses are solicited from at least a portion of devices 560 to perform an analysis of qualitative patterns. Question object 521 may comprise, at least: object identifier 522 which may be a globally unambiguous persistent identifier representing an instance of question object 521; question text 523 may be an arrangement of information comprising textual description in the form of an open-ended question; number 524 may be an additional unique identifier for the instant question object 521 that may indicate an index of the instant question in a sequence or series of related question objects in a project object 521; process object pointer 525 may be a pointer to an associated process object 503, for example, to have access to the process object 503 through its memory address instead of a new object being created on a stack.

Priority value object 530 may be a plurality of programming instructions stored in memory 240 that when executed by processors 210 comprise an object describing details around a priority value received from a participant device 561. It should be noted that in a typical analysis, a plurality of priority value objects may be associated with a thought object 514 for an analysis of qualitative patterns as described throughout this specification. Priority value object 530 may comprise: object identifier 531 which may be a globally unambiguous persistent identifier representing an instance of priority value object 530; thought object 514 may be a pointer to a corresponding thought object 514, for example, to have access to the an associated thought object 514 through its memory address instead of a new object being created on a stack; participant object pointer 533 is a pointer to participant object 526 that assigned priority value 534 (mentioned below); priority value 534 may be a numeric identifier of the priority value received from a corresponding participant device 561 associated with the participant object 526 referenced in participant object pointer 533 (in some embodiments, priority value 534 may be an alphanumeric value, a Boolean, an identifier to an emoticon or some other graphical representation, or the like); process object pointer 535 may be a pointer to a process object 503 to, for example, have access to the process object 503 through its memory address instead of a new object being created on a stack.

Process object 503 may be a plurality of programming instructions stored in memory 240 that when executed by processors 210 comprise an object describing a process corresponding to a project object 503 for an analysis of qualitative patterns. A process may provide a procedure for how a project is to be executed, for example, how thought objects 514 will be distributed, how responses are received and processed, and the like. Process object 503 may comprise: object identifier 510 which may be a globally unambiguous persistent identifier representing an instance of process object 503; name 511 may be textual description of the instance of the process object 503; participation code 512 may be an additional unique identifier associated with the instant process object 503; project object pointer 513 may be a pointer to a corresponding project object 502 to, for example, have access to the project object 502 through its memory address instead of a new object being created on a stack.

Participant object 526 may be a plurality of programming instructions stored in memory 240 that when executed by processors 210 comprises an object to describe a participant associated with a participant device 561 (that is, each participant object corresponds to a corresponding device 561). In some embodiments, participant objects may be assigned to devices 560 that have participated (for example, provided priority values to one or more thought objects, or provided one or more thought objects 514 in response to a question object 521). Participant object 526 may comprise, at least: object identifier 527 which may be a globally unambiguous persistent identifier representing an instance of participant object 526; process object pointer 528 may be a pointer to an associated process object 503 to, for example, have access to the process object 503 through its memory address instead of a new object being created on a stack; project object pointer 536 may be a pointer to a project object 502 to, for example, have access to the project object 502 through its memory address instead of a new object being created on a stack; device ID 529 identifies an associated device 560. It should be noted that, in a preferred embodiment, a tenant object 501 may represent properties and methods corresponding to a user, or group of users, of the system (for example, a company, organization, or the like). Each tenant object 501 may be associated with one or more project object 502 that may provide details around a project for exchanging information following one or more processes associated with one or more process objects 503 whereby at least one question object 521 and a plurality of thought objects 510 describe an interaction by devices 560 (at least a portion of which are associated with a participant objects 526) whereby interaction comprises, at least, an assignment of priority values 534 to thought objects 514.

FIG. 5B is a block diagram illustrating an exemplary conceptual architecture of a thought object selection computer, according to a preferred embodiment of the invention. According to the embodiment, thought object selection environment 540 comprises a plurality of components each comprising at least a plurality of programming instructions, the programming instructions stored in memory 240 that when executed by one or more processors 210, cause one or more processor 210 to perform operations disclosed herein. In a preferred embodiment, a question object 546 is received at a project controller 552 from a first facilitator device 562. The question object may then be distributed, by the project controller 552 to at least a portion of a plurality of devices 560, subsequently, a plurality of thought objects 514 may be received from at least a portion of the at least portion of the plurality of devices 560, whereby the thought objects 514 may be redistributed to at least a portion of the plurality of devices 560 with a request for an assignment, by at least a portion of the plurality of participant devices 561, of one or more priority values. It should be appreciated that questions objects 521 when received from a facilitator device 562, the objects and associated parameters may be stored in object database 538. Similarly, thought objects 514 received from the at least portion of the at least portion of the plurality of devices 560 may be stored in object database 538. In some embodiments, one or more priority value objects comprising the one or more priority values associated with a corresponding thought object 514 of the plurality of thought objects 514 are received by one or more devices 560. In some embodiments, project controller 552 may process methods disclosed herein based at least in part on configuration within project object and process object.

Prior to project controller 552 processing the plurality of priority value objects for the plurality of thought objects 514 from the plurality of devices 560, object selector 553 may use algorithms described herein (referring to FIGS. 6-10) to filter and select objects for distribution to one or more devices 560. It should be appreciated that question object 521 and at least a portion of the plurality of thought objects 514 (and other associated objects) may be associated with at least one project object 502. In a preferred embodiment, a tenant object 501 may have one or more associated project objects 502, that is, that a tenant may perform a plurality of mutually exclusive projects (also referred to herein as an exchange) to understand the dynamics and behaviors of a plurality of users via a plurality of devices. Though in a preferred embodiment, projects are self-contained in nature (in terms of analyses that are performed), it should be appreciated that in some embodiments, projects may be interrelated, and calculations by system 540, may be performed across a plurality of projects.

According to some embodiments, each thought object 514 must meet certain criteria in order to qualify for inclusion into a filter and select computation. These criteria are combinations of meeting (or failing to meet) certain thresholds, as analyzed by a thought-text parser 555, a topic calculator 554, and object selector 553. Device interface 551 may manage input/output communications to devices 560, and in some embodiments, to response database 557, over network 310.

Project controller 552 may manage an execution of an exchange of thought objects, whereby project controller 552 may manage receiving and distributing question objects 521 to devices 560, manage receiving and distributing thought objects 514, and receiving and distributing priority value objects via device interface 551.

In a preferred embodiment, object selector 553 filters and selects one or more thought objects 514 for distribution to one or more devices 520. Techniques for filtering and selection by objects selector 553 may comprise, but not limited to, diversity of thought object based on an analysis of thought object topics, frequency of delivery of a thought object to one or more devices 560, random selection, and the like.

In a preferred embodiment topic calculator 554 may be used to compute a topic of which text within one or more thought objects 514 may represent, that is, quantitatively determine a computed difference between a plurality of thought objects based on informational contents within one or more thought object. Further to the embodiment, topic calculator 554 may calculate topic vectors and topic tables.

In a preferred embodiment, thought-text parser 555 may generate a plurality of text based on a vocabulary, the vocabulary generated by parsing text from one or more thought objects 514. In some embodiments text originated from an automatic speech recognition process as is known in the art (not shown). In some embodiments, thought-text parser 555, may modify word contents of the plurality of text by, for example, removing stop words, stemming words, tokenizing words, determine frequency of words, etc. Topic generator 556 may generate a plurality of topic vectors in a topic table, each topic vector associated with a thought object of the plurality of thought objects 514. A topic vector may be used to identify topics associated with a thought object 514 calculated based on techniques described herein (referring to FIG. 6). Topic vectors may be used to calculate a diversity score whereby diversity is defined as a Euclidean distance between thought objects 514 previously rated by a particular participant device 561 and thought objects 514 not yet rated by the particular participant device 561 (that is, one or more thought objects 514 available to be selected for distribution to the particular participant device 561).

Response database 557 may store received response information from the plurality of devices 560. In some embodiments, response database 557 may hold priority value responses while in others, priority value responses are held in priority value objects 530. Object database 558 may provide database storage for objects 500, both preconfigured and objects with assigned data fields. Configuration database 559 provides storage for systems configuration components, for example, at least, configuration for devices 560, system components 540, and the like. It can be appreciated by one with ordinary skill in the art that the above referenced databases provide an exemplary set of databases required to implement components of system 540 and data necessary to execute the disclosed methods.

Devices 560 may comprise participant devices 561 and facilitator devices 562. A facilitator device 562 may configure a project object 502 associated with one or more question objects 521 to solicit a plurality of thought objects 514 based on an arrangement of information in the form of an open-ended free-flow question for the purpose of receiving priority value responses received, by project controller 552, from at least a portion of plurality of participant devices 561 (whereby the at least portion of devices may be hereinafter referred to as participant devices 561) and stored in a plurality of priority value objects 530 for analysis by system 540. In a preferred embodiment, facilitator devices 562 may initiate and manage a project (as defined in a project object 502 that comprises one or more question objects 521 via a process defined in process object 503) and at least a portion of participant devices 561 (i.e. those that have responded), comprise participant objects 560. In some embodiments, facilitator devices 562 may be considered participant devices and may act as both a facilitator device 562 and a participant device 561.

Detailed Description of Exemplary Embodiments

Figure 5C:
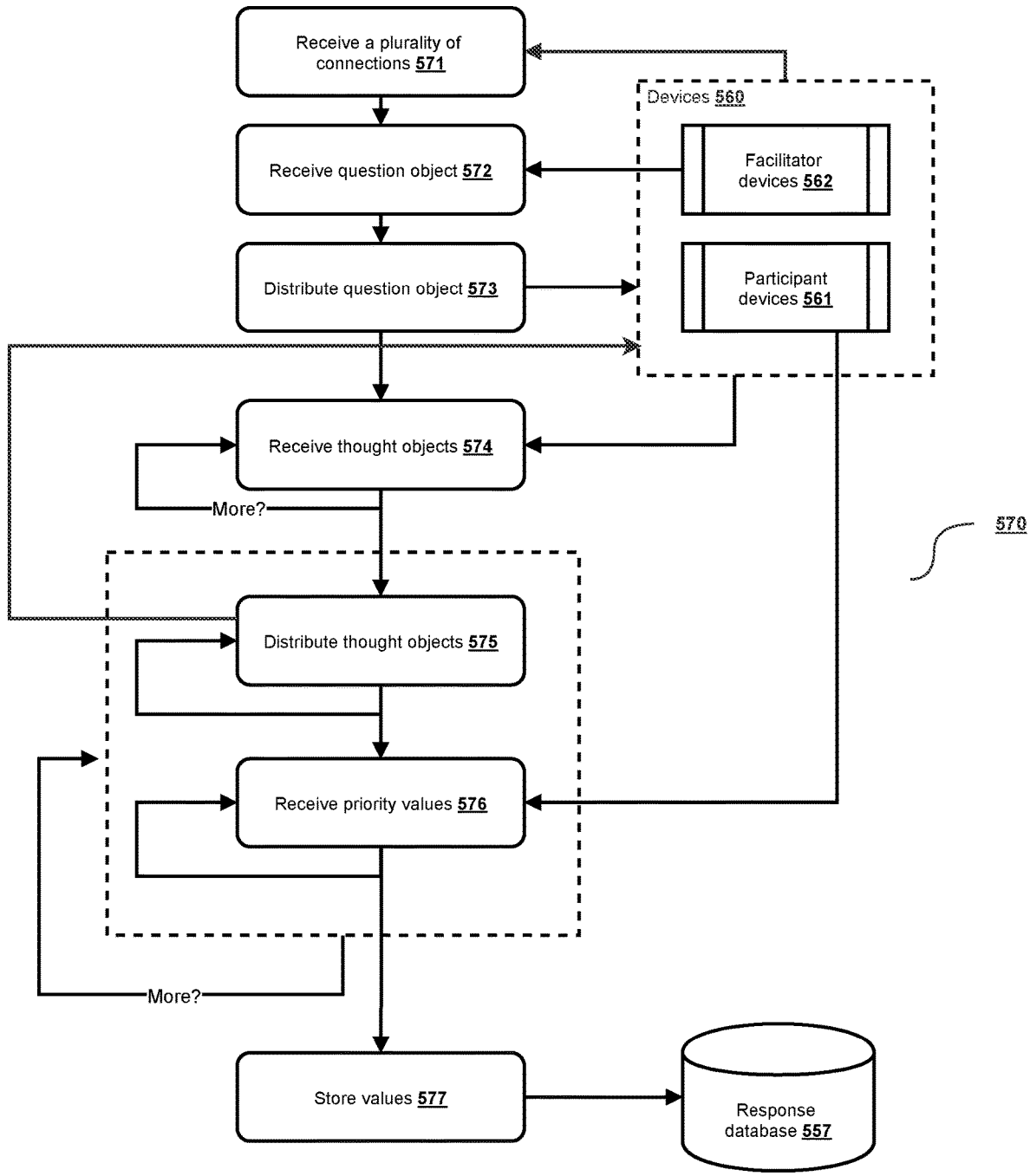
FIG. 5C is a flow diagram illustrating a method for conducting a process to solicit thought objects and priority value responses from a plurality of devices, according to a preferred embodiment of the invention.

FIG. 5C is a flow diagram illustrating a method for conducting a process to solicit thought objects and priority value responses from a plurality of devices, according to a preferred embodiment of the invention. According to the embodiment, in a first step 571, a plurality of connections from a plurality of devices 560 are received via network 310 at device interface 578 to enable communication between system 540 and connected devices 560 and, in some embodiments, remote response database 563. In a next step 572, question object 521 is received, by project controller 552, from a first facilitator device 562 via device interface 551 to begin a process to solicit thought objects and priority value responses. It should be appreciated that question object 521 may be associated to a previously configured project object 502 and belong to a tenant object 501. Question object 521 may comprise an arrangement of information comprising open-ended free-form text arranged in a manner whereby responses from at least a portion of participant devices 561 may be solicited (for example, arranged in the form of a question), the expected responses comprising a plurality of thought objects 514. In a next step 573, project controller 552 may then distribute question object 521 to at least a portion of devices 560 via device interface 551 on network 310. In a next step 574, a plurality of thought objects 514 may be received by at least a portion of devices 560, the plurality of thought objects 514 each comprising, at least, an arrangement of information (for example, within thought_detail 517), the arrangement of information comprising open-ended free-form text arranged in a manner whereby responses from at least a portion of participant devices 561 may be solicited, the expected responses comprising a plurality of priority value objects 530, each priority value object 530 comprising priority value 535 comprising a priority value associated to a thought object (for example thought object 532 may associate priority value 535 to a corresponding thought object 514). Further in step 574, topic generator 556 generates a plurality of topic vectors in a topic table, each topic vector associated to a thought object 514 of the plurality of thought objects 514. In a next step 575, the plurality of thought objects 514 may be distributed, by project controller 552, to at least a portion of user devices 560 via device interface 551 over network 310, utilizing thought selection algorithms described herein (referring to FIG. 6) to one or more devices 560. In a next step 576, project controller 552 may receive a plurality of priority value objects 530 (herein referred to as priority value responses) from at least a portion of devices 560, the plurality of priority value responses each associated to a corresponding thought object 514 (as described previously), the at least portion of responding devices 560 herein also referred to as participant devices 560, each priority value response associated to a corresponding thought object 514 and a corresponding participant device of the participant devices 560. In a next step 577, project controller 552 may store the plurality of thought objects 514 and associated priority value responses in response database 557 (in some embodiments, project controller 552 may store the plurality of thought objects 514 and associated priority value responses in remote response database 563 via network 310).

Figure 6:
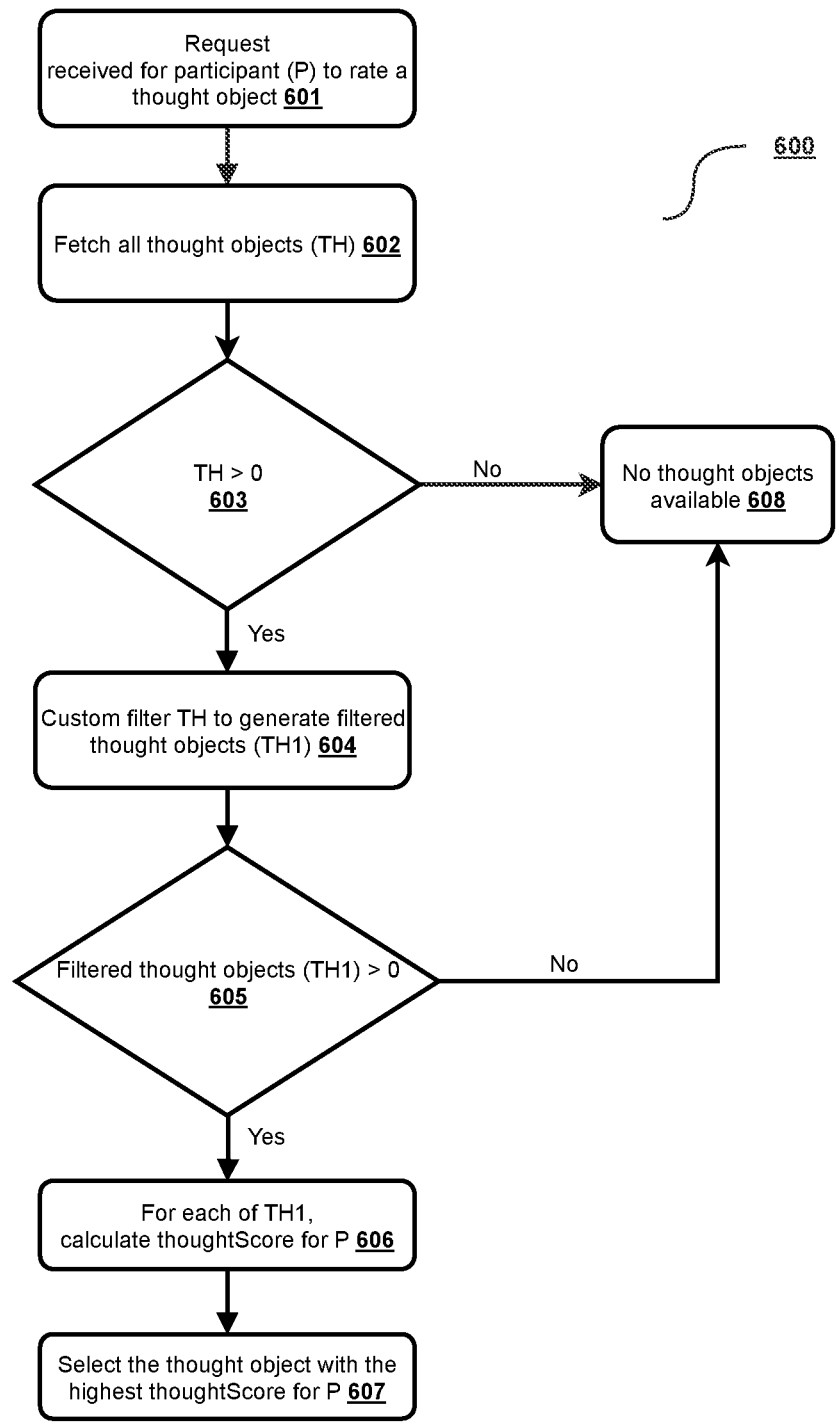
FIG. 6 is a flow diagram illustrating a method for thought object selection based on a plurality of filtering and selection methods, according to a preferred embodiment of the invention.

FIG. 6 is a flow diagram 600 for a method for thought object selection based on a plurality of filtering and selection methods, according to a preferred embodiment of the invention. According to the embodiment, method 600 starts at step 601, where a request is received, from a participant device 561 P, to rate a thought object. In a next step 602, all thought objects are retrieved. In a next step 603, project controller 552 checks a quantity of shared thought objects. If the quantity T of the shared thought objects TH is greater than zero, then the retrieved thought objects are custom filtered to generate filtered thought objects TH1 in step 604. For example, thought objects previously rated by participant device 561 P may be removed from shared thought objects TH to generate filtered thought objects TH1. If the quantity of the thought objects is zero within the thought objects TH, then there are no thought objects for selection (step 608). Once filtered, zero or more filtered thought objects TH1 may be returned. In an example, the thought objects may be filtered based on whether a subset of the thought objects have not been previously distributed to the participant device 561 for rating. If no filtered thought objects TH1 are returned in step 605, then there are no thought objects available for selection (step 608). If there are filtered thought objects TH1 available at step 605, project controller 552 may calculate a thoughtScore for each of the filtered thought objects TH1 at step 606. In an example, the thoughtScore may be a cumulative sum of multiple score values, including but not limited to, numRatingsScore, highRatingsScore, and ownThoughtsScore. In an embodiment, the numRatingsScore may be operable to favor thought objects that have not received many ratings by participant devices 561. This may be done to ensure that each of the filtered thought objects may have a chance to be selected as one of the highest rated thought objects. The numRatingsScore may be set be set to any function of the number of ratings received by a thought object that falls towards 0, as the number of ratings may rise to a value high enough to give a reasonable measure of the popularity of the thought object. For instance, the numRatingsScore may be calculated by the following exemplary sequence:

$$numRatingsScore = (numRatings + 1)^{-\frac{3}{4}}$$

where numRatings is the number of ratings a thought object has received from one or more participant devices 561 combined.

In some embodiments, the highRatingsScore may be designed to favor thought objects that have higher ratings than other thought objects. This may be advantageously performed to ensure that subjects for discussion associated with thought objects that are highly rated overall are distributed to a larger number of participant devices 561 for rating. The highRatingsScore value may ensure that participant devices 561 do not miss out in assigning ratings to thought objects that are highly rated overall; and therefore, may get an adequate opportunity to be assigned to a subject for discussion associated with the highly rated thought object. The highRatingsScore may be set be set to any function of the ratings received by a thought object that is low for thought objects that are rated low overall and high for thought objects that are highly rated overall. In an example, the highRatingsScore may be calculated by object selector 553 as the following exemplary sequence:

$$highRatingsScore = \frac{\text{Bayesian Average rating}}{\text{predefined maximum rating}}.$$

Further, in a preferred embodiment, the predefined maximum rating may be set to 5 and a predefined minimum rating for a thought object may be set to 1, though in other embodiments other values may be used. The Bayesian Average rating, in turn, may be calculated by object selector 553 as given by the following exemplary sequence:

$$\text{Bayesian Average Rating} = \frac{C \cdot m + \text{Total Ratings}}{C + numRatings}$$

wherein, m may denote a prior mean of the predefined maximum and minimum ratings, while C is a constant, which may be chosen based on the number of ratings required for a robust estimate of the sample mean rating. For instance, according to the above example, m may be 3 and C may be 5. The Bayesian Average may be used to ensure that thought objects with a low number of ratings do not feature unduly high or low in the overall ratings of thought objects. For instance, if a thought object has been rated by only a single participant device 561 so far, giving it a maximum rating of 5, the mean rating comes out to be 5. However, it may be entirely possible that every other participant device 561 that rates the thought object may give this thought object a rating of 2 or below. Therefore, in such an instance, the mean rating of 5 for the thought object may make it the highest-rated thought in the exchange, even when another thought object that may have been rated by 100 participant devices 561 with a mean rating of 4.7, may be a more preferred thought object overall. Using the Bayesian Average rating, the thought object with a single rating of 5 receives an overall rating of 3.33, while the thought object rated by 100 participant devices 561 may receive an overall rating of 4.6, thus more accurately reflecting a confidence in the overall rating of the thought object.

In an embodiment, the ownThoughtsScore may be designed to favor, or disfavor thought objects that a participant may themselves have shared. This may be done to ensure that a participant may be less likely to see thought objects that they have shared themselves initially, however, they are more likely to see their shared thought objects periodically, for example, after every five thought objects rated. Such an arrangement may render thought objects in a manner that a participant equally rates thought objects that they themselves share as well as thought objects that other participant devices 561 have shared, as well. The ownThoughtsScore may be set to any function that varies with time and with whether thought objects were shared by the participant themselves, for instance, a function that may be initially low and periodically high for thought objects that a participant have themselves shared. In an embodiment, the ownThoughtsScore may be −1 for thought objects shared by a participant themselves when selecting the first, second, third, or fourth thought object to be rated by the participant. For thought objects shared by the participant themselves, when selecting the fifth, tenth, or other multiples of 5, thought object to be rated by the participant, the ownThoughtsScore may be 1. For all other thought objects, the score may be 0.

Referring again to FIG. 6, at a step 607, object selector 553 may select a thought object with a highest thoughtScore to distribute to the participant device 561 for rating.

Figure 7:
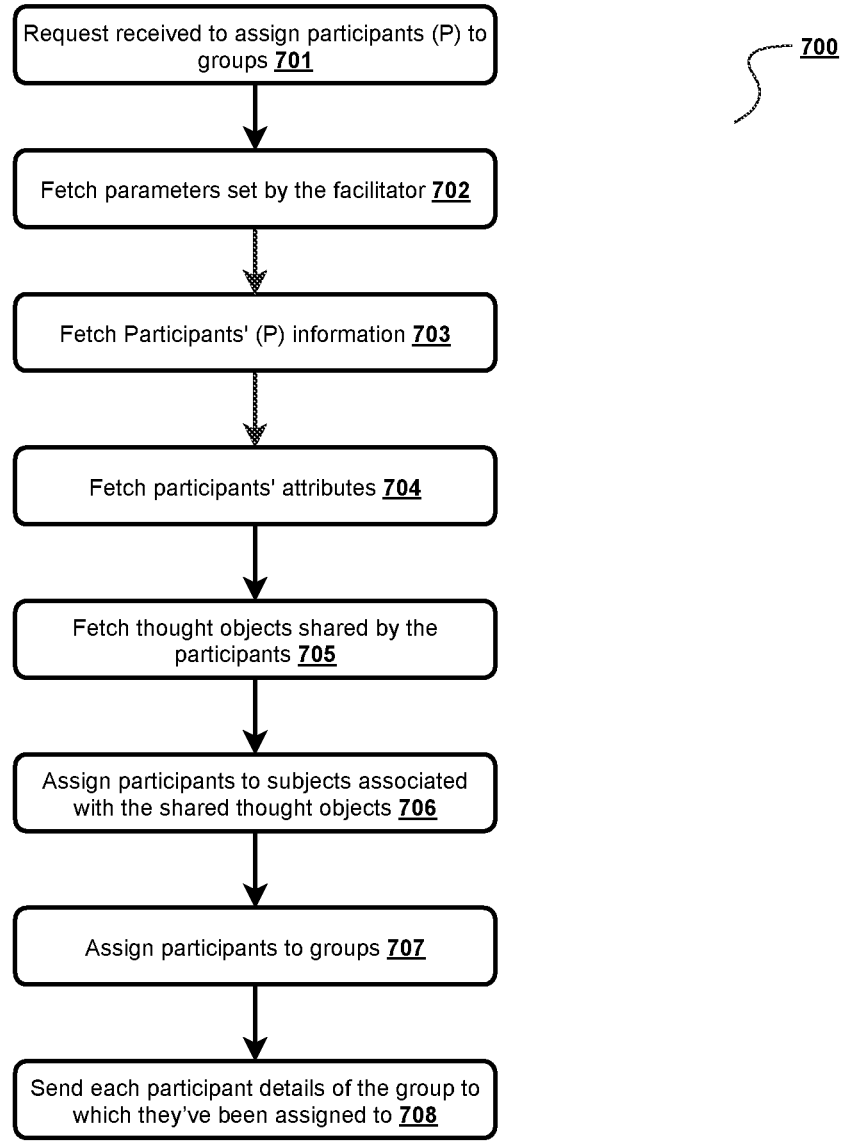
FIG. 7 is a flow diagram illustrating a method for assigning participant devices to one or more subjects for discussion selected from thought objects, according to a preferred embodiment of the invention.

FIG. 7 is a flow diagram 700 illustrating a method for assigning participant devices 561 to one or more groups to discuss subjects associated with selected thought objects, according to a preferred embodiment of the invention. According to the embodiment, project controller 552, at a step 701, may receive a request to assign participant devices 561 to groups. In a next step 702, subject selector 564 may receive one or more preconfigured parameters set by one or more facilitator devices 562. It should be appreciated that facilitator devices 562 may comprise one or more facilitators. In some embodiments, a facilitator device 562 may be the same as a participant device 561. In some embodiments, the preconfigured parameters may comprise, but not limit to, strategySetting, diversityWeight, numGroups or maxGroups, minPeoplePerGroup, maxPeoplePerGroup, blocked subjects, fixed groups, and the like. The preconfigured parameters may be stored in configuration database 559.

According to an embodiment, a value for strategySetting may be received from facilitator device 562 by project controller 552 and stored in configuration database 559. The value of strategySetting may be preconfigured so as to increasingly favor contrarianism for increasingly low values or increasingly favor conformity for increasingly high values. For instance, the strategySetting value may be set by the facilitator to favor contrarianism, to advantageously provide for skewing of the overall pattern of assignment towards assigning participant devices 561 to groups to discuss subjects associated with thought objects in which the assigned participant devices 561 are interested but most other participant devices 561 are not interested, specifically, thought objects which the assigned participant devices 561 rated high but most other participant devices 561 rated low. For example, for a certain group of participant devices 561, that have provided a rating of 5 to a thought object comprising, for example, thought text "Machine Learning", to be assigned to a group featuring, for example, Machine Learning as a subject for discussion, even when a Bayesian Average rating for that thought object may be 2, since indicia may be received from most other participant devices 561 regarding disinterest in discussing Machine Learning as a subject. To advantageously provide for such skewing towards contrarianism, the strategySetting may be set by the facilitator to a low value, for instance, −0.99. For another instance, the strategySetting value may be set by the facilitator to favor conformity, for example, to favor assignment of participant devices 561 to subjects that they rate similarly to other participant devices 561. This may be done to ensure that the overall pattern of assignment may be skewed towards groups of participant devices 561 to discuss subjects associated with thought objects that most other participant devices 561 may also be interested in. To advantageously provide for such skewing towards conformity, the strategySetting may be set by the facilitator to a high value, for instance, 0.99. For yet another instance, the strategySetting may be set by the facilitator to an intermediate value, for instance, 0, to favor neither contrarianism nor conformity.

Further according to another embodiment, diversityWeight may be a value received from facilitator device 562, by project controller 552, so as to increasingly favor uniformity of the participant devices 561 in each group for increasingly low ratings or increasingly favor diversity of the participant devices 561 in each group for increasingly high ratings. The diversityWeight, in an embodiment, may be used in two different settings—variable control and/or on and off control. For variable control, the diversityWeight may have a scale ranging from, for example, −4 to 4 depending on a position of a diversity slider on a scale of uniformity to diversity of participant devices 561. Further, in an on/off control the diversity weight may be set to −1 if the facilitator device 562 may have configured uniformity of participant devices 561 as one of the grouping criteria, 1 if the facilitator device 562 may have configured diversity of participant devices 561 as one of the grouping criteria, and 0 if the facilitator device 562 may have configured neither. In an example, the strategySetting may be used to break ties between assignments of participant devices 561 to subjects for discussion of identical utility, in cases where diversityWeight equals to 0.

In some embodiments, numGroups may specify the number of total groups that the group generator 565 may create or maxGroups may specify the maximum number of groups that may be created. For instance, the facilitator device 562 may set the numGroups value to 10 to configure the group generator 565 to create a total of ten groups. Similarly, for example, at an all-company meeting in a conference center, there may be only 15 rooms available for the use of breakout groups, so the maximum number of groups may be set to 15. Further, minPeoplePerGroup may specify the minimum number of participant devices 561 in each group. Similarly, maxPeoplePerGroup may specify the maximum number of participant devices 561 in each group. For example, at the all-company meeting, the rooms available for the use of breakout groups may have a maximum capacity of 30 people, so the maxPeoplePerGroup value may be set to 30.

In some embodiments, parameters defining the creation of groups may be received from one or more facilitator device 562. For instance, parameters may be received indicating subjects for discussion that may be configured to be blocked whereby no groups may be created, by group generator 565, to discuss those subjects, and/or fixed groups that may be created, by group generator 565, each time, irrespective of other grouping parameters. That is, certain subjects may be blocked, so that a generation, by group generator 565, of groups to discuss those subjects may be prevented. For example, if a participant shares a thought object comprising thought text, "Let's all go to the pub and get drunk", indicia may be received from facilitator device 562 to block the thought object as inappropriate, so that no groups are generated, by project controller 552, to discuss that subject, no matter how many participant devices 561 rate it highly. Further, when desirable groups are identified by the facilitator, either groups generated on prior execution, or groups determined independently by the facilitator, they may be fixed, by facilitator device 562, so that these groups (including associated thought object and the participant devices 561 assigned to the group) may persist on subsequent executions as well.

Referring again to FIG. 7, project controller 552 may receive, at a step 703, one or more participant devices 561, and at a step 704, one or more participant attributes associated with each of the one of more participant devices 561. In an embodiment, the one or more participant attributes may comprise answers to survey questions provided on respective participant devices 561, and/or information associated with a participant received from a database. In an example, the participant attributes may comprise one or more of geographical location of residence and/or workplace, organization department, years of service with an organization, and the like. In a next step 705, project controller 552 may receive one or more thought objects shared by one or more participant devices 561. In an example, project controller 552 may receive the one or more thought objects from one or more participant devices 561.

Figure 8:
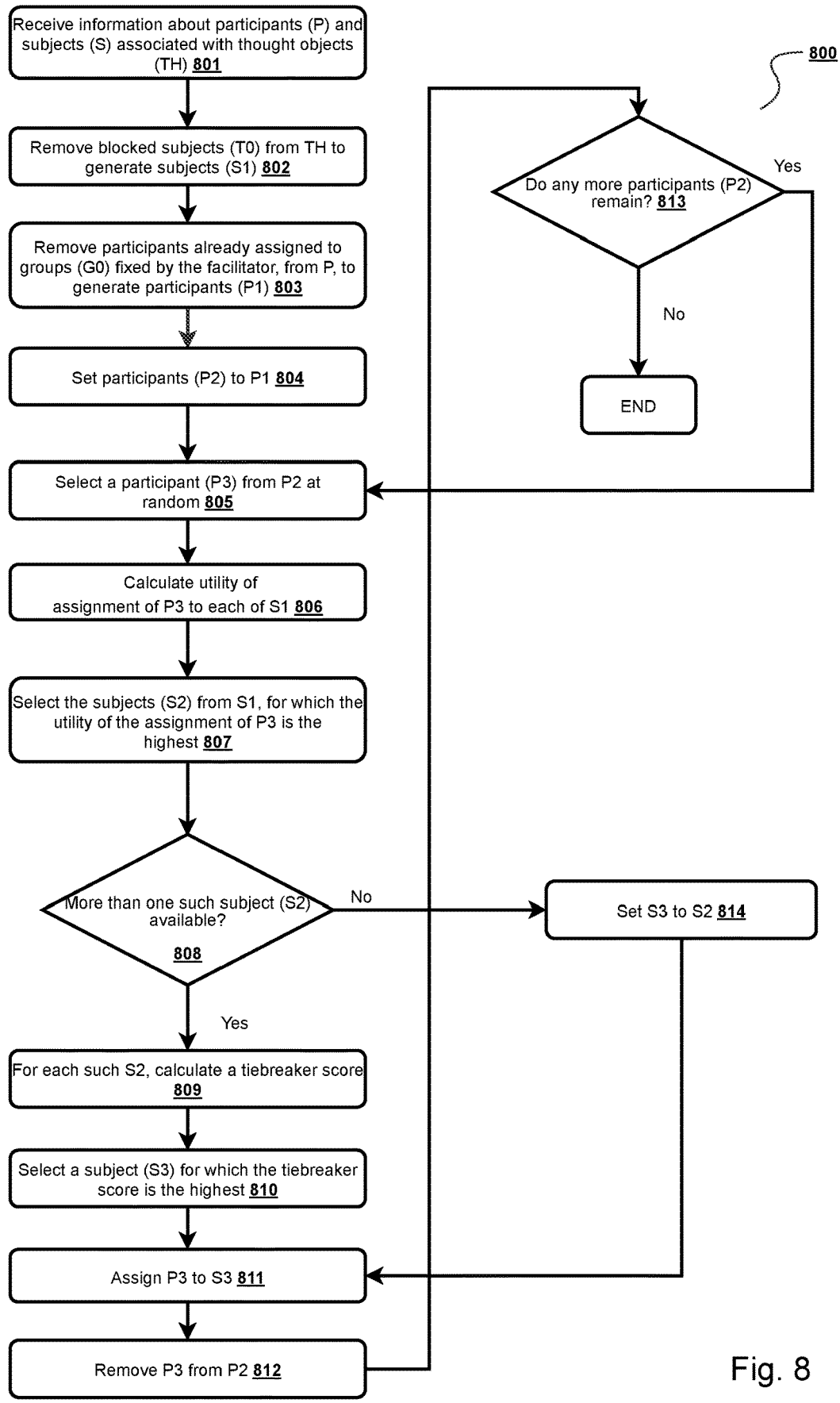
FIG. 8 is a flow diagram illustrating a method for assigning participant devices to subjects for discussion selected from thought objects, according to a preferred embodiment of the invention.

In a next step 706, subject selector 564 may assign one or more participant devices 561 to subjects for discussion associated with the shared thought objects, by an assignment method (referring to FIG. 8). Further, in a next step 707, group generator 565 may assign participant devices 561 to groups using one or more assignment methods, as described in conjunction with FIGS. 9 and 10. In a next step 708, project controller 552 may send each participant details of the group they have been assigned to, for example, to a graphical user interface associated with each participant device 561.

FIG. 8 is a flow diagram 800 illustrating a method for assigning participant devices 561 to subjects for discussion associated with a plurality of thought objects, according to a preferred embodiment of the invention. According to the embodiment, in a first step 801, project controller 552 may receive from one or more participant devices 561, information about participant devices 561 P and subjects for discussion S associated with thought objects TH shared by the participant devices 561. In a next step 802, subject selector 564 may remove subjects that may be marked as blocked subjects TO as received by facilitator device 562, to generate subjects S1. Further, in a step 803, subject selector 564 may remove participant devices 561 P0 already assigned to groups that may be marked as mandatory (hereinafter "fixed groups") by facilitator device 562, to determine participant devices 561 P1. In an embodiment, when removing participant devices 561 P0 already assigned to fixed groups, subject selector 564 may retain subjects associated with fixed groups, which allows for additional groups to be found, by group generator 565, for the associated subjects.

In a next step 804, subject selector 564 may set participant devices 561 P2 as participant devices 561 P1. In a next step 805, subject selector 564 may select a participant P3 from the participant devices 561 P2, at random.

In a next step 806, subject selector 564 may calculate a utility of assignment of the participant P3 to each of the subjects for discussion S1. In some embodiments, a utility of assignment may be indicative of how valuable an assignment of a particular participant may be to a specific subject. For example, if a participant rates a thought object proposing a first subject higher than a thought object proposing a second subject, the utility of assignment may be higher when the participant is assigned to the first subject than to the second subject, since it may be more efficient to assign the participant to the first subject that they have rated higher and therefore are more likely to be interested in discussing. In an example, the utility of assignment may be calculated, by subject selector 564 and/or group generator 565, using the following sequence:

$$utility = ratingScore + diversityScore$$

The ratingScore may be operable to favor assignment, by subject selector 564 and/or group generator 565, of participant devices 561 to groups to discuss subjects proposed in thought objects that received high ratings from participant devices 561. This may be performed, by subject selector 564 and/or group generator 565, to ensure that that participants are given an adequate option to discuss subjects they prefer. In some embodiments, the ratingScore may be set to any function of a rating assigned by a participant to a thought object proposing a subject to be discussed by a group to which the participant is assigned, by subject selector 564 and/or group generator 565. The function may be defined in a manner that the ratingScore is low where the rating is low and high where the rating is high. For example, subject selector 564 and/or group generator 565 may assign a ratingScore to the assignment of a participant to a subject equal to the rating provided by the participant to the thought object proposing the subject, e.g. a highest ratingScore of 5 if a highest rating of 5 is provided by the participant and a lowest ratingScore of 1 if a lowest rating of 1 is provided by the participant. However, if the participant did not rate the thought object proposing the subject, a fixed ratingScore may be assigned, for example, 2.5. This may be done to ensure that the participant is more likely to be assigned, by subject selector 564 and/or group generator 565, to a subject they did not rate than to a subject they gave a rating of 2, but less likely to be assigned, by subject selector 564 and/or group generator 565, to a subject not rated by the participant than to a subject with rating of 3 rated by the participant.

The diversityScore may provide configuration to subject selector 564 and/or group generator 565 in order to favor assignments of participant devices 561 to subjects or groups to which the participants add diversity. This may be to ensure that groups comprise a good mix of participants that represent and may provide, for example, diverse thought. For example, at a company meeting, a mix of participant devices 561 from different teams (e.g. from the operations, Sales, and R&D teams), different locations (e.g. from different offices or geolocations) and with different lengths of service at the company (e.g. employees with less than 1 of service, employees with 1-3 years of service, and employees with more than 3 years of service) are assigned to a particular group. Further, diversityScore may be set to any function of the participant devices' attributes that is low where participant devices 561 in the same group have the same attributes and high where participant devices 561 in the same group have different attributes (in order to keep the group participation diverse). For instance, in case the participants have at least one attribute, determined, for example, from responses to survey questions provided on participant devices 561 and/or from a database of information associated with participants, the diversityScore for the assignment of a participant to a subject or a group may be given by the following exemplary sequence:

> diversityScore=(-diversityWeight×(number of duplicate attributes between the participant and other participant devices 561 in the subject/group to which the participant has been assigned)/(number of attributes)/(number of other participant devices 561 in the subject/group)).

That is, if diversityWeight is 1, for a first participant device (associated with, for example, a user residing in a first geolocation, working in the R&D department, and has worked for more than 3 years at the company), assigned to a group with a second participant device (associated with, for example, a user residing in the first geolocation, working in the R&D department, and has worked for less than 1 year at the company), a third participant device (associated with, for example, a user residing in a second geolocation, works at the S&M department, and has spent 1-3 years working at the company) and a fourth participant device (associated with, for example, a user residing in a third geolocation, works in the G&A department, and has worked for more than 3 years at the company), then the number of duplicate attributes between the first participant device is 3 (same location as the second participant device, same team as the second participant device, same time at the company as the fourth participant device). Therefore, the diversityScore may be calculated, by project controller 552, as: (−1×(3 duplicate attributes)/(3 attributes)/(3 other participant devices))=−⅓. In case the participants have zero attributes, the diversity-Score may be set to 0.

Referring again to FIG. 8, in a next step 807, subject selector 564 may select subjects for discussion S2 from the subjects for discussion S1, for which the value of utility of assignment is the highest for the participant P3. In a next step 808, subject selector 564 may determine whether more than one such subjects are available. If it is determined only a single such subject S2 is available, subject selector 564 may set a subject S3 to a single subject S2, at a step 814. Method may then move to step 811. However, if it is determined, by subject selector 564, that more than one such subjects are available, in a next step 809, subject selector 564, may calculate a tieBreakScore for each such subject. In some embodiments, the tieBreakScore may be used, by subject selector 564, to break any ties between subjects S2 having similar values of utility of assignment, and the subject S3 having the highest tieBreakScore may be chosen in step 810. The tieBreakScore may be set, by subject selector 564 and/or group generator 565, to any function that breaks the tie either randomly or according to a strategy received from the facilitator device 562. For instance, the tieBreakScore may be given using the following exemplary sequence:

> tieBreakScore=strategySetting*highRatingsScore+(1−abs(strategySetting))*randomScore where, highRatingsScore may be calculated as described in the foregoing, and randomScore may be set to any function that introduces randomness to balance the highRatingsScore. For example, the randomScore may be any number between 0.2 to 1, to balance the highRatingsScore, that may vary between 0.2 and 1, where participant devices 561 may assign ratings to each thought object between 1 and 5. Taking several examples of different strategySetting values, the tieBreakScore may break ties randomly. In an example, if the strategySetting value equals to 0, the tieBreakScore is random such that all subjects are treated equally. In another example, if the strategySetting value equals to 1, the tieBreakScore is the Bayesian Average rating such that thought objects with high ratings across all participant devices 561, i.e. subjects that most other people are interested in, are favored, resulting in higher conformity in subjects selected to be discussed in groups. In yet another example, if the strategySetting value equals to −1, the tieBreakScore is negative the Bayesian Average rating such that thought objects with low ratings across all participant devices 561, i.e. subjects that most other participant devices 561 are not interested in, are favored, resulting in higher contrarianism in subjects selected for discussion in groups.

Referring again to FIG. 8, in a next step 811, subject selector 564 may assign participant P3 to the subject S3. Further, in a next step 812, the participant P3 may be removed, by subject selector 564, from the participant devices 561 P2. In a next step 813, the subject selector 564 may determine if there are any more participant devices 561 remaining in the participant devices 561 P2. In case where it is determined that more participant devices 561 remain, method 800 may continue to step 805.

Figure 9:
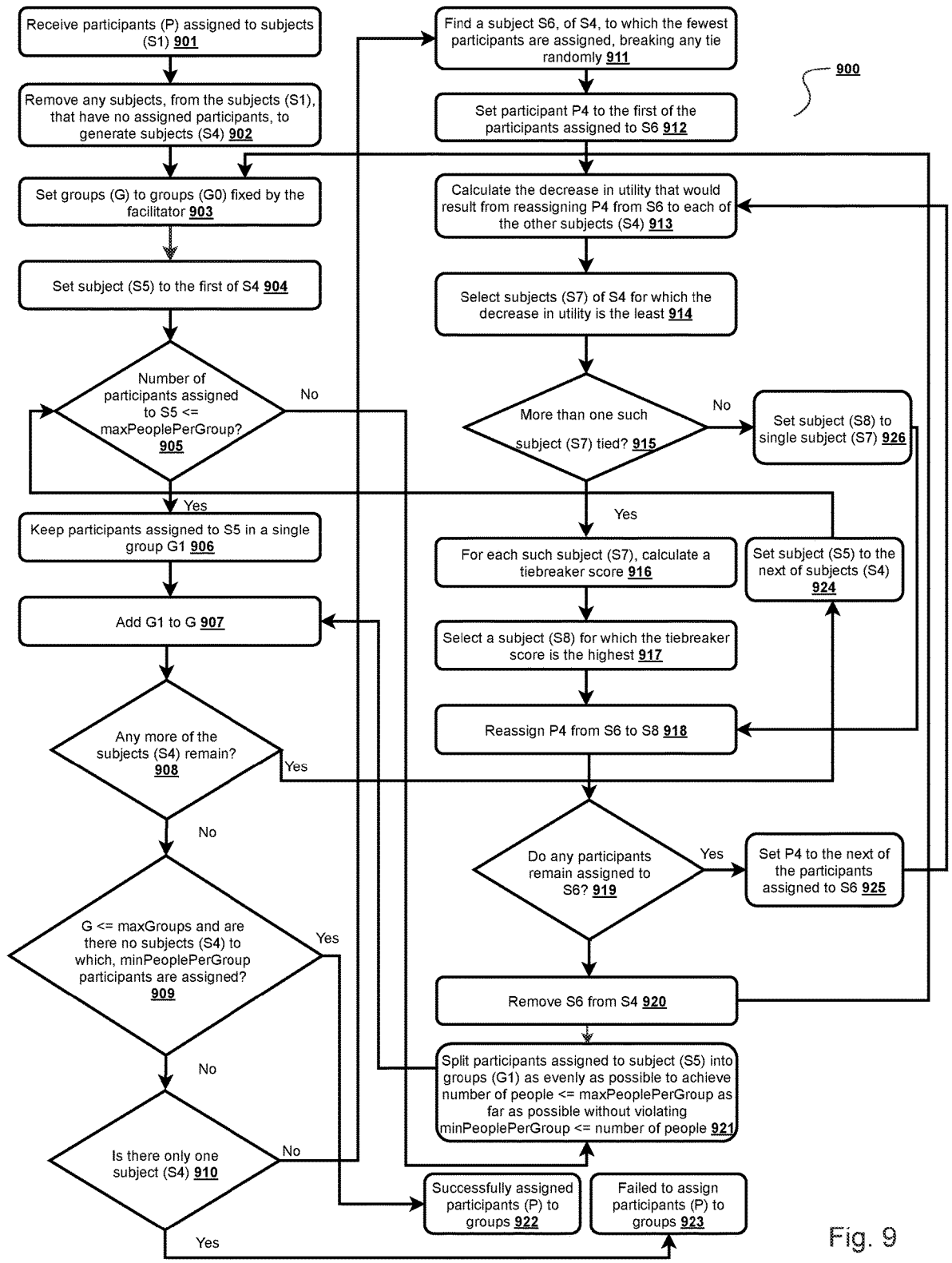
FIG. 9 is a flow diagram illustrating a method for assigning participant devices to groups, according to a preferred embodiment of the invention.

FIG. 9 is a flow diagram 900 illustrating a method for assigning participant devices 561 to groups, according to a preferred embodiment of the invention. In an embodiment where it is desired that meeting participant devices' preferences is prioritized over meeting a strict maximum number of people per group, in a first step 901, project controller 552 may receive information whereby participant devices 561 P1 may be assigned, for example, by subject selector 564, to subjects S1. In a next step 902, group generator 565 may remove subjects from the subjects S1 that have no participant devices 561 assigned, to generate subjects S4. In a next step 903, group generator 565 may set groups G to groups G0 fixed by the facilitator, as received from facilitator device 562. Further, in a next step 904, group generator 565 may set a subject S5 to first of the subjects S4.

In a next step 905, group generator 565 may determine if the number of participant devices 561 assigned to the subject for discussion S5 is lower than the value of maxPeoplePerGroup. If so, in a next step 906, group generator 565 may keep participant devices 561 assigned to the subject S5 in a single group G1. However, if the number of participant devices 561 assigned to the subject S5 is not lower than the value of maxPeoplePerGroup, in a next step 921, group generator 565 may split participant devices 561 assigned to the subject S5 into the groups G1 substantially evenly (that is, as evenly as possible), such that the number of participant devices 561 may be lesser than or equal to the value of maxPeoplePerGroup, while ensuring that the minPeoplePerGroup value is lesser than or equal to the number of participant devices 561. For instance, the subjects may be split into groups to ensure that the number of participant devices 561 are greater than or equal to the value of minPeoplePerGroup, but lesser than equal to the value of maxPeoplePerGroup. Further, in an embodiment where it may not be possible to meet both of the above conditions simultaneously, the priority may be to ensure that the number of participant devices 561 are greater than or equal to the value of minPeoplePerGroup. Further, for a subject, where the number of participant devices 561 is less than or equal to the value of maxPeoplePerGroup, the participant devices 561 may be pooled together, by group generator 565, as a single group.

In a next step 907, group G1 may be added to the groups G. In a next step 908, group generator 565 may determine whether there are any more subjects S4 remaining. If so, in a next step 924, group generator 565 may set subject S5 as the next of subjects S4. Method 900 may continue to step 905. Referring again to step 908, if no more of subjects S4 remain, in a next step 909, group generator 565 may determine if the number of groups G is less than or equal to the value of maxGroups and if there are no subjects S4, for which the number of participant devices 561 assigned is less than the value of minPeoplePerGroup. If so, method 900 may continue to step 922, wherein a notification of the participant devices 561 P, successfully assigned to groups G, may be transmitted, by project controller 552, to one or more of facilitator devices 562. Otherwise, if it is determined by group generator 565 that the number of groups G is not less than or equal to the value of maxGroups, or that there are subjects S4, for which the number of participant devices 561 assigned is less than the value of minPeoplePerGroup, method continues to step 910 where group generator 565 may determine if there is only a single subject remaining in subjects S4. If so, method 900 continues to step 923, wherein a notification of failure of assignment of participant devices 561 to group may be transmitted, by project controller 552, to one or more facilitator devices 562. Otherwise, if it is determined that more than one subject remains in subjects S4, method 900 continues at step 911, wherein group generator 565 may find a subject S6, from subjects S4, to which the fewest number of participant devices 561 may be assigned. If there are more than one such subjects in a tied arrangement, group generator 565, may break such ties randomly. In a next step 912, group generator 565 may set a participant device 561 P4 to the first of participant devices 561 assigned to the subject S6. In a next step 913, group generator 565 may calculate a decrease in a value of utility that would result from reassigning the participant device 561 P4 from the subject S6 to each of the other subjects S4. The utility values may be calculated based on the exemplary sequence provided in the aforementioned steps. Further, in a next step 914, group generator 565 may select subjects S7 of the other subjects S4, for which the decrease in the value of utility resulting from such a reassignment may be the least.

In a next step 915, group generator 565, may determine if more than one subject exists, for which the decrease in the value of utility assignment is the same. In case it is determined that more than one such subject exists, in a next step 916, group generator 565 may calculate a tieBreakScore for each such subject. The tieBreakScore may be calculated based on the exemplary sequence provided in the aforementioned steps. In a next step 917, group generator 565 may select a subject S8 for which the tieBreakScore is the highest. In a next step 918, group generator 565 may reassign participant device 561 P4 from the subject S6 to subject S8. Referring again to step 915, if it is determined, by group generator 565, that there remains only a single subject for which the decrease in the value of the utility resulting from the reassignment is the least, method 900 continues to step 926, wherein group generator 565 may set the subject S8 to the subject S7, and method 900 continues to the step 918.

In a next step 919, group generator 565 may determine if any participant devices 561 remain assigned to subject S6. If so, in a next step 925, group generator 565 may set the participant device 561 P4 to a next of the participant devices 561 assigned to the subject S6. Method 900 may then continue to step 913. Otherwise, if it is determined that no such participant devices 561 remain, in a next step 920, group generator 565 may remove subject S6 from the subjects S4. Method 900 may then continue to step 903.

Figure 10A:
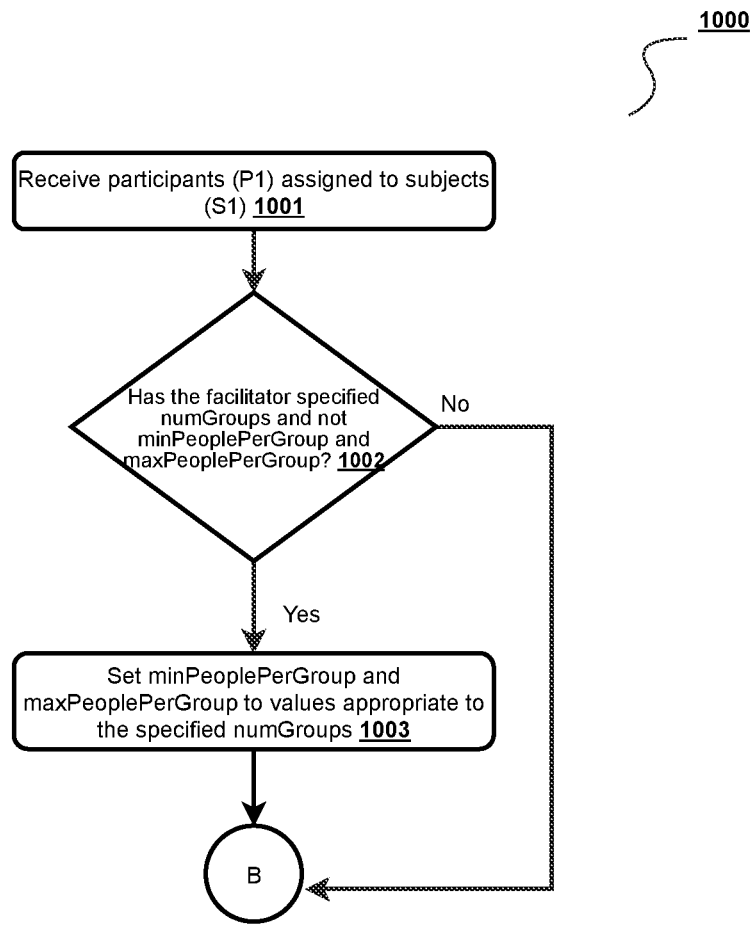

FIG. 10A is a flow diagram 1000 illustrating another method for assigning participant devices 561 to groups, according to a preferred embodiment of the invention. According to the embodiment, method 1000 may begin at step 1001, wherein project controller 552 may receive information whereby participant devices 561 P1 may be assigned, for example, by subject selector 564, to subjects S1, in a step 1001. In a next step 1002, project controller 552 may determine if values are received from facilitator device 562, for numGroups but not for minPeoplePerGroup and maxPeoplePerGroup. In case it is determined that values are received for numGroups but not for minPeoplePerGroup and maxPeoplePerGroup, in a next step 1003, project controller 552 may set minPeoplePerGroup and maxPeoplePerGroup to values that may be appropriate to the specified value of numGroups. Method 1000 may then move to FIG. 10B.

In some embodiments, project controller 552 may calculate values of minPeoplePerGroup and maxPeoplePerGroup using the following sequences:

$$minPeoplePerGroup = rounddown\left(\frac{numParticipants}{numGroups}\right) - 2$$

$$maxPeoplePerGroup = roundup\left(\frac{numParticipants}{numGroups}\right) + 2$$

Figure 10B:
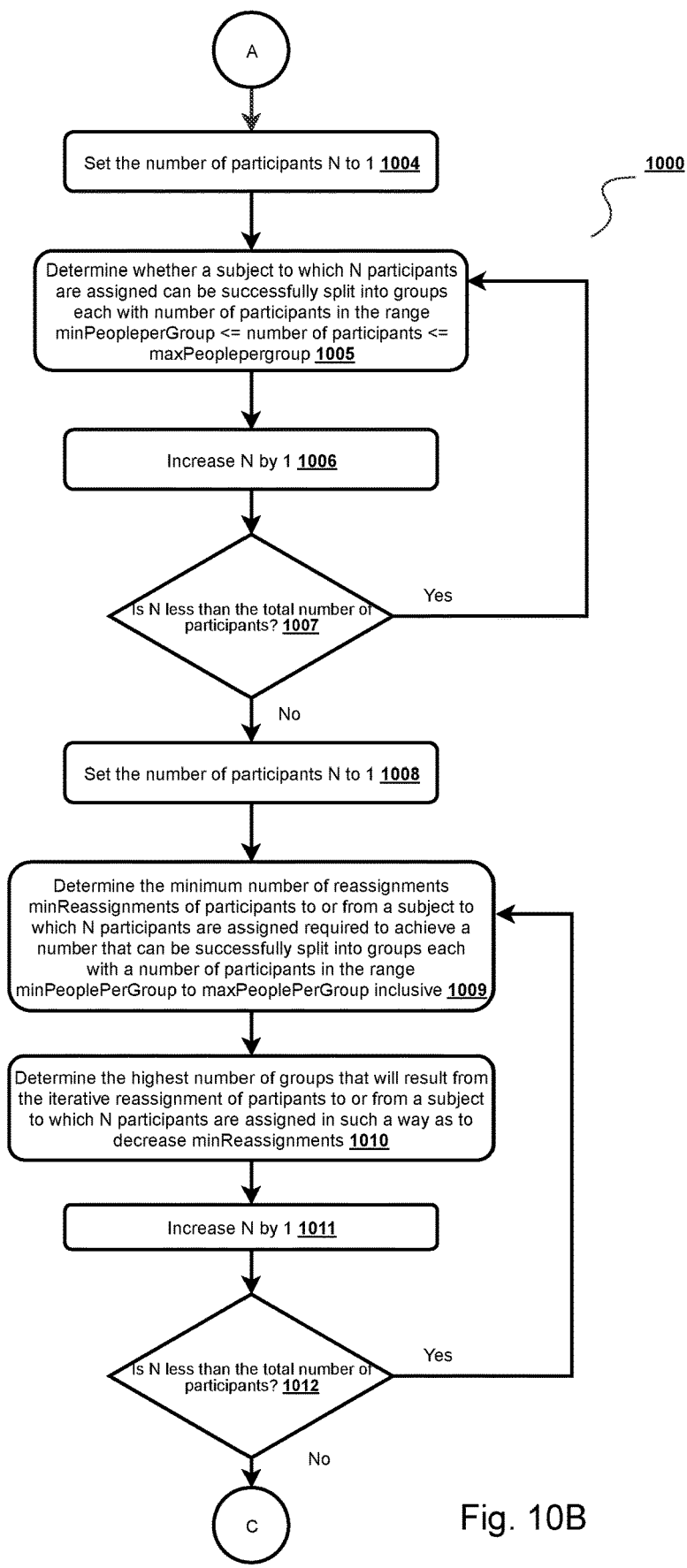

However, in case it is determined that values for numGroups have not been received from facilitator device 562, or that values for minPeoplePerGroup and maxPeoplePerGroup have been received from facilitator device 562, method 1000 continues to FIG. 10B.

FIG. 10B illustrates a portion of the flow diagram 1000 for a method of adjusting a number of participant devices 561 assigned to each subject for discussion, according to a preferred embodiment of the invention. Method 1000 may continue from step 1004, wherein group generator 565 may set the number of participant devices 561 N to 1. In a next step 1005, group generator 565 may determine whether a subject to which N participant devices 561 are assigned can be successfully split into smaller groups, each with the number of participant devices 561 assigned greater than or equal to the value of minPeoplePerGroup, but lesser than or equal to the value of maxPeoplePerGroup. In a next step 1006, group generator 565 may increment the value of N by 1. In a next step, the group generator 565 may determine if the value of N is less than the total number of participant devices 561. If the value of N is less than the total number of participant devices 561, method 1000 continues to step 1005. However, if the value of N is not less than the total number of participant devices 561, group generator 565, in a next step 1008, may again set the value of N to 1.

In a next step 1009, the group generator 565 may determine a minimum number of reassignments, given by a value of minReassignments, of participant devices 561 to or from a subject to which N participant devices 561 are assigned. The minimum number of reassignments may be determined to achieve a number of participant devices 561 that can be successfully split into groups, each with a number of participant devices 561 within the range minPeoplePerGroup to maxPeoplePerGroup. For instance, if a value of minPeoplePerGroup is 6 and a value of maxPeoplePerGroup is 7, as received from facilitator device 562, then subjects to which, for example, 1, 2, 3, 4 or 5 participant devices 561 are assigned may be removed. Further, a subject to which, for example, 6 or 7 participant devices 561 are assigned may be a valid group and therefore the value of minReassignments would be 0. A subject to which 8 participant devices 561 are assigned may be contracted into a subject from which a valid group can be made by reassigning 1 participant device 561 from the subject to another subject, and therefore the value of minReassignments in such a case shall be 1. Similar calculations may be performed for a subject having number of participant devices 561 as, for example, 9, 10, 11, etc.

Referring again to FIG. 10B, in a next step 1010, group generator 565 may determine a highest number of groups that may result from the iterative reassignment of participant devices 561 to or from a subject to which N participant devices 561 are assigned, in such a way as to decrease the value of minReassignments. For instance, if the value of minPeoplePerGroup is 6 and maxPeoplePerGroup is 7, as received from facilitator device 562, then subjects to which, for example, 1, 2, 3, 4, or 5 participant devices 561 are assigned may be removed. Further, for a subject to which, for example, 6 or 7 participant devices 561 are assigned, may be clubbed as a single group. Similarly, for a subject to which, for example, 8 or 9 participant devices 561 are assigned, a total of, for example, 1 or 2 participant devices 561 may be reassigned so as to form a single group. In the same manner, for a subject to which, for example, 10 or 11 participant devices 561 are assigned, a total of 1 or 2 participant devices 561 may be assigned to the subject so as to form 2 groups. Similar calculations may be performed for subjects with, for example, 12, 13, 14, or any such number of participant devices 561 assigned.

In a next step 1011, group generator 565 may again increase the value of N by 1, and again determine if the value of N is less than the total number of participant devices 561, in a step 1012. If it is determined that the value of N is less than the total number of participant devices 561, method 1000 continues to step 1009. However, if it is determined that the value of N is not less than the total number of participant devices 561, method 1000 continues to FIG. 10C.

Figure 10C:
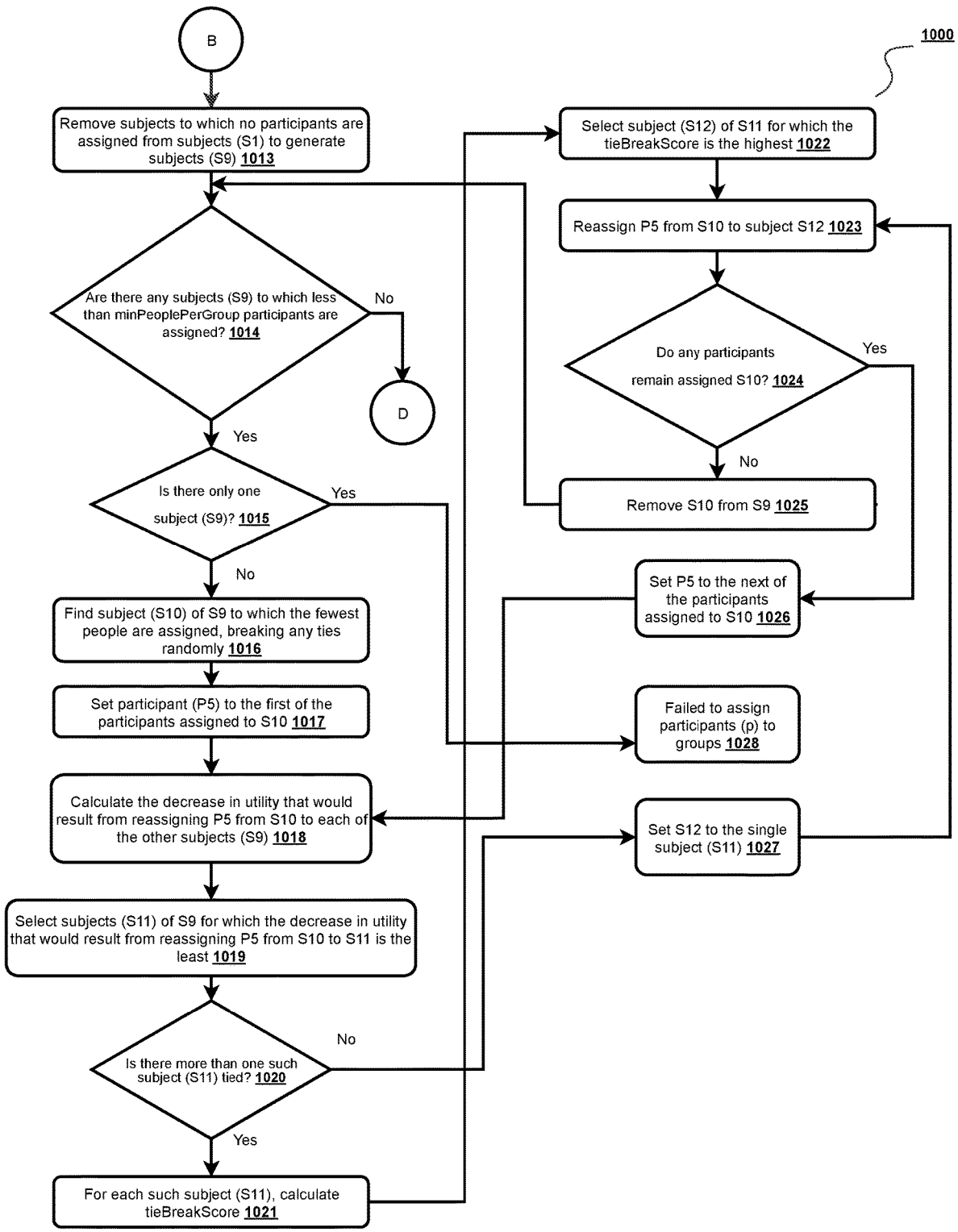

FIG. 10C illustrates another portion of flow diagram 1000, illustrating a method of removing one or more subjects for discussion, according to a preferred embodiment of the invention. Method 1000 may continue from step 1013, wherein group generator 565 may remove subjects, from subjects S1, to which no participant devices 561 may have been assigned to generate subjects S9. In a next step 1014, group generator 565 may determine if there are any subjects from the subjects S9, to which the number of participant devices 561 assigned is lesser than the value of minPeoplePerGroup. In case there are no such subjects, step 1014 continues to step 1029 to FIG. 10D. However, if such subjects exist, step 1014 continues to a next step 1015, wherein group generator 565 may determine if there is only one subject S9. In case there is only one subject S9, project controller 552 may transmit a notification of failed assignment of participant devices 561 to subjects, in a step 1028, to one or more of facilitator devices 562. In some embodiments, in such scenarios, project controller 552 may transmit a message to one or more of facilitator devices 562, to request one or more relaxed requirements to allow the assignment of participant devices 561 to groups.

However, if there are more than one subjects S9, in a next step 1016, group generator 565 may find a subject S10, from the subjects S9, to which the fewest participant devices 561 may be assigned. Again, if there are more than one such subjects available, group generator 565 may break such ties randomly. In a next step 1017, group generator 565 may set the participant device 561 P5 as a first of participant devices 561 assigned to the subject S10. Further, in a next step 1018, group generator 565 may calculate a decrease in the utility of assignment that would result from reassigning the participant device 561 P5 from the subject S10, to each of the other subjects S9. In a next step 1019, group generator 565 may select subjects S11 for which the decrease in the utility of the assignment has the least value. Then, in a next step 1020, group generator 565 may determine if there are more than one such subjects. In case there are more than one such subjects, in a next step 1021, group generator 565 may calculate the tieBreakScore for each such subject. The tieBreakScore may be calculated based on the exemplary sequence provided in the aforementioned steps. In a next step 1022, group generator 565 may select a subject S12, from subjects S11, for which the tieBreakScore may be the highest. In a next step 1023, group generator 565 may reassign the participant device 561 P5 from the subject S10 to the subject S12.

It may then be determined, in a next step 1024, by group generator 565, whether there are any more participant devices 561 assigned to the subject S10. If there are more participant devices 561 assigned to the subject S10, method 1000 continues to step 1026, wherein project controller 552 may set the participant device 561 P5 to a next of the participant devices 561 assigned to the subject S10. Method 1000 then continues to step 1018. However, if there are no more participant devices 561 assigned to the subject S10, in a next step 1025, group generator 565 may remove subject S10 from the subjects S9. Method 1000 then continues to step 1014.

Otherwise, in case it is determined in step 1020 that there is only one subject S11 for which the decrease in the utility of assignment has the lowest value, in a next step 1027, group generator 565 may set the subject S12 to a single subject from the subjects S11. Method 1000 then continues to step 1023.

Figure 10D:
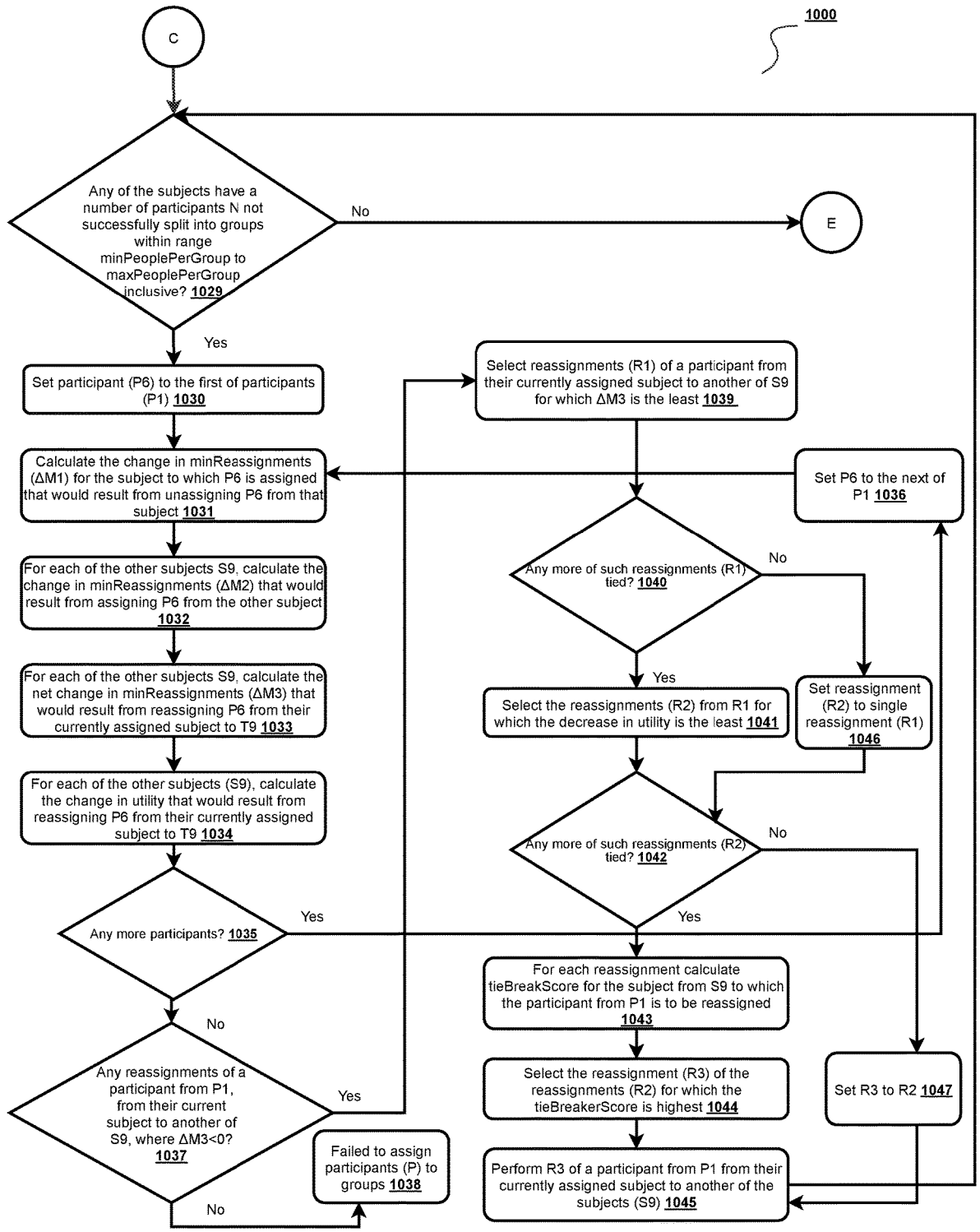

FIG. 10D illustrates yet another portion of the flow diagram 1000, for a method of assigning participant devices 561 to groups in order to fulfil one or more grouping criteria, according to a preferred embodiment of the invention. According to the embodiment, step 1029 continues from step 1014, wherein group generator 565 may determine if any of the subjects for discussion S9 have a number of participant devices 561 N that cannot be successfully split into groups such that the number of participant devices 561 N lie in a range between the value of minPeoplePerGroup and maxPeoplePerGroup. In case there are no such subjects identified, step 1029 may continue to step 1048 (referring to FIG. 10E). However, if it is determined that such subjects are present, in a next step 1030, group generator 565 may set a participant device 561 P6 to first of the participant devices 561 P1. In a next step 1031, group generator 565 may calculate the change in the value of minReassignments Δ M1, that may result from unassigning the participant device 561 P6 from the subject to which the participant device 561 P6 is assigned to. Further, in a next step 1032, group generator 565 may calculate the change in a value of minReassignments Δ M2, that may result from assigning participant device 561 P6 to each of the other subjects S9. Furthermore, in a next step 1033, group generator 565 may calculate, for each of the other subjects S9, a net change in the value of minReassignments Δ M3, equal to the sum of Δ M1 and Δ M2, that may result from reassigning the participant device 561 P6 from the subject the participant device 561 P6 is currently assigned to, to the other subject S9. In a next step 1034, group generator 565 may calculate, for each of the other subjects S9, a change in the value of the utility of assignment that may result from reassigning the participant device 561 P6 from the subject the participant device 561 P6 is currently assigned to, to the other subject S9. The utility values may be calculated based on the exemplary sequence provided in the aforementioned steps. In a next step 1035, the group generator 565 may then determine if there are any more participant devices 561 left. If such participant devices 561 are identified, method 1000 may move to a step 1036, wherein group generator 565 may set the participant device 561 P6 to the next of the participant devices 561 P1, after which method 1000 continues to step 1031. However, if there are no more participant devices 561 left, method 1000 may move to a next step 1037, wherein group generator 565 may determine if there are any reassignments of a participant from the participant devices 561 P1, from their currently assigned subject to any other subject from the subjects S9, where the value of Δ M3 is less than 0. If no such reassignment is found, method 1000 continues to step 1038, wherein project controller 552 may transmit a notification to one or more of facilitator devices 562 indicating failure of assignment of participant devices 561 P to groups. In such a scenario, one or more facilitator devices 562 may also be transmitted notifications to request relaxed grouping criteria. Otherwise, if such a reassignment is found, method 1000 may move to a next step 1039, wherein group generator 565 may select reassignments R1 of a participant device 561 from a currently assigned subject to another of the subjects S9, such that the value of net change in minReassignments 4 M3 is the least. If there are more than one such reassignments, as determined by group generator 565 at step 1040, method 1000 continues to a next step 1041 wherein group generator 565 may select one or more reassignments R2 from the reassignments R1 for which the decrease in the value of the utility of assignment is the least. However, if there is only a single such reassignment R1, in a next step 1046, group generator 565 may set a reassignment R2 to the single reassignment R1.

In an embodiment, method 1000 may then move to a step 1042, wherein group generator 565 may determine if there are more than one reassignments R2 that are tied. If not, method 1000 may move to a next step 1047, wherein group generator 565 may set reassignment R3 to the single reassignment R2 and method continues to a step 1045. However, if there are more than one reassignments R2 that are tied, in a next step 1043, group generator 565 may calculate, for each such reassignment, a tieBreakScore, for the subject of subjects S9 to which the participant of participant devices 561 P1 is to be reassigned. The tieBreakScore may be calculated based on the exemplary sequence provided in the aforementioned steps. In a next step 1044, project controller 552 may select the reassignment R3 of the reassignments R2, for which the tieBreakScore may be the highest. Further, in step 1045, the reassignment of the participant from the participant devices 561 P1 from their currently assigned subject to another subject of the subjects S9, may be performed by group generator 565. Method 1000 then returns to step 1029 from step 1045.

Figure 10E:
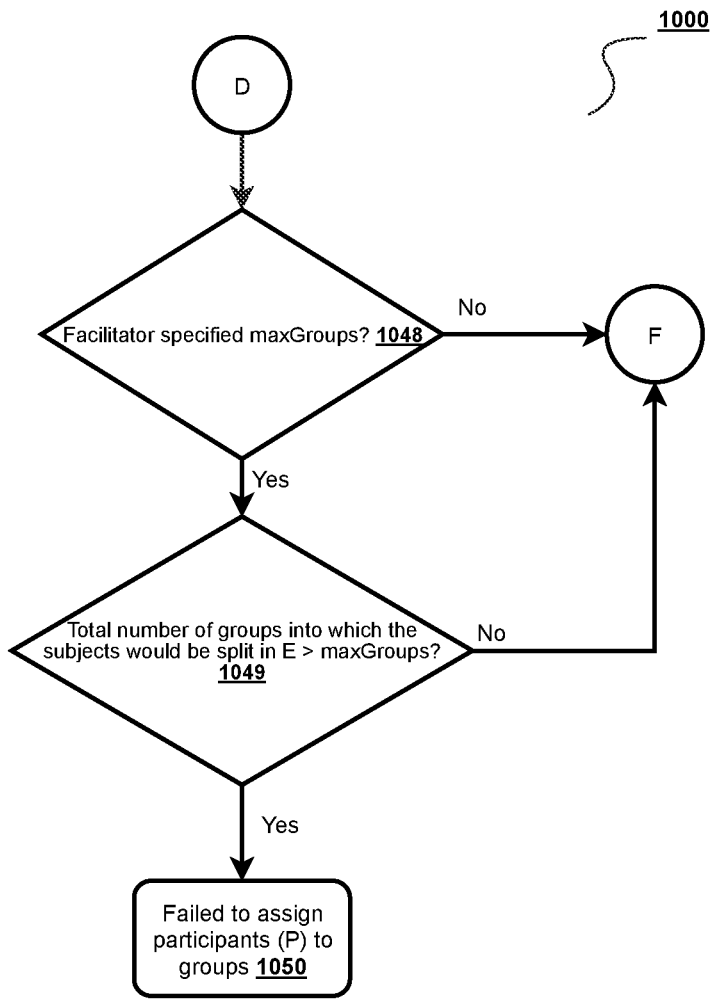

FIG. 10E illustrates yet another portion of the flow diagram 1000, for a method for determining whether an acceptable number of groups would be formed, according to a preferred embodiment of the invention. According to the embodiment, method 1000 may continue from step 1029 to step 1048, wherein project controller 552 may determine whether a value of maxGroups is received from facilitator device 562. In case that no value has been received, step 1048 may continue to step 1051 (referring to FIG. 10F). Otherwise, if a value of maxGroups has been received, in a next step 1049, group generator 565 may determine whether the total number of groups to be formed, into which subjects for discussion S9 would be split, is greater than the value of maxGroups. In case that the number of such groups is not greater than the value of maxGroups, step 1049 may continue to step 1051 (referring to FIG. 10F). However, if the number of such groups is greater than the value of maxGroups, project controller 552 may transmit a notification to one or more of facilitator devices 562 indicating failure of assignment of participant devices 561 P to groups. In such a scenario, a message may be transmitted to facilitator devices 562 to request for relaxed grouping criteria. This may be done to encourage easing of the grouping requirements, for example, such as to change a requirement of the number of participant devices 561 from 6-7 participant devices 561 per group, to 6-8 or 6-9 participant devices 561 per group, or simply increase the maximum number of groups. Such relaxations may advantageously facilitate for easier conformation to group requirements, whilst ensuring that participant devices 561 end up in groups for subjects they want to discuss.

Figure 10F:
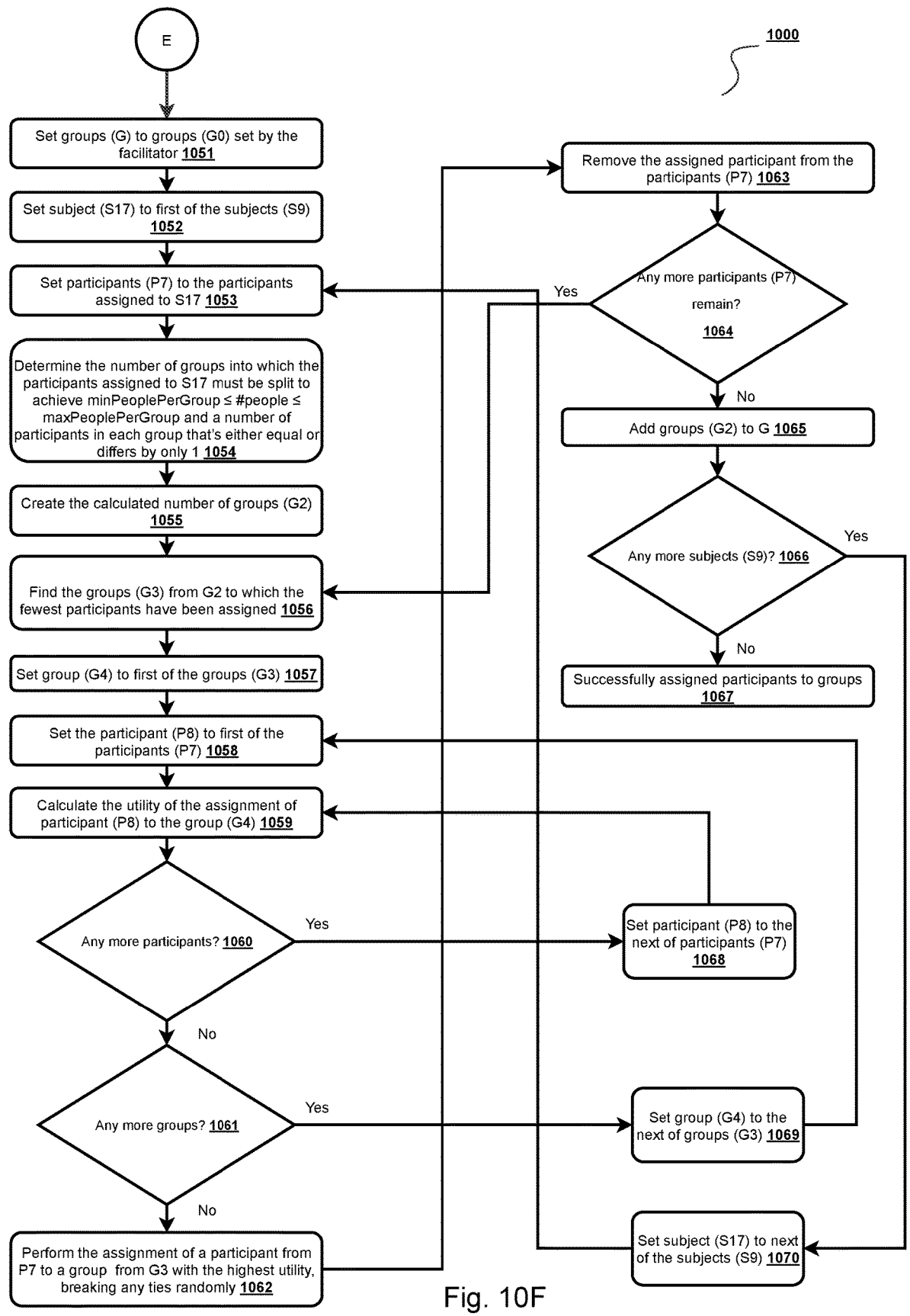

FIG. 10F illustrates yet another portion of the flow diagram 1000, illustrating a method for splitting subjects for discussion into groups, according to a preferred embodiment of the invention. According to the embodiment, method 1000 may continue from step 1048 or step 1049 to step 1051, wherein group generator 565 may set the groups G to groups G0 fixed by the facilitator, as received from facilitator device 562. In a next step 1052, group generator 565 may set subject S17 to the first of the subjects S9. In a next step 1053, group generator 565 may set participant devices 561 P7 to the participant devices 561 assigned to the subject S17 In a next step 1054, group generator 565 may determine a number of groups into which the participant devices 561 assigned to the subject S17 must be split, in order to ensure that the number of participant devices 561 in each group is substantially greater than or equal to the value of minPeoplePerGroup, but substantially lesser than or equal to the value of maxPeoplePerGroup, and that the number of participant devices 561 in each group is either equal or differs by 1 (that is, a difference of 1 signifies substantially greater than or less than). Once the number of such groups is determined, in a next step 1055, group generator 565 may create the number of groups G2. In an embodiment, in a next step 1056, group generator 565 may determine groups G3, from the groups G2, that have the fewest number of participant devices 561 assigned. In a next step 1057, group generator 565 may then set a group G4 as the first one of the groups G3 and in a next step 1058 set a participant device 561 P8 to the first one of the participant devices 561 P7.

In a next step 1059, the group generator 565 may calculate the utility of assignment of the participant device 561 P8 to the group G4. The utility values may be calculated based on the exemplary sequence provided in the aforementioned steps. In a next step 1060, group generator 565 may determine if there are any more participant devices 561 P7 left. If there are more participant devices 561 left, in a next step 1068, group generator 565 may set a participant device 561 P8 as the next of the participant devices 561 P7, and method 1000 continues to step 1059 thereafter. However, if there are no more participant devices 561 left, in a next step 1061, group generator 565 may determine if there are any more groups G3 left. If there are more groups left, in a next step 1069, group generator 565 may set the group G4 as the next of the participant devices 561 G3, and method 1000 continues to step 1058 thereafter.

In a next step 1062, group generator 565 may perform the assignment of a participant device 561, from the participant devices 561 P7, to a group from groups G3, that has the highest value of utility of assignment. If there are more than one such assignments tied with similar values of utility of assignment, group generator 565 may break such ties randomly. Further, in a next step 1063, the assigned participant device 561 may be removed from the participant devices 561 P7 by group generator 565. In a next step 1064, group generator 565 may then determine if more participant devices 561 P7 remain. If more participant devices 561 remain, method 1000 continues to step 1056. However, if no more participant devices 561 remain, in a next step 1065, group generator 565 may add groups G2 to the groups G. Furthermore, in a next step 1066, group generator 565 may determine if any more subjects S9 remain. If more subjects remain, in a step 1070, group generator 565, may set the subject S17 to next of the subjects S9, and method may continue from step 1053 thereafter. However, if no more subjects remain, in a next step 1067, project controller 552 may send a notification to one or more of facilitator devices 562, indicating successful assignment of participant devices 561 to the groups. In some embodiments, project controller 552 may transmit a message to one or more of participant devices 561, indicating the group and/or the subject for discussion to which the respective participant device 561 has been assigned.

The skilled person will be aware of a range of possible modifications of the various embodiments described above. Accordingly, the present invention is defined by the claims and their equivalents.

What is claimed is:

1. A system for grouping a plurality of user devices comprising:
   a device grouping computer comprising a memory, a processor, and a plurality of programming instructions, the plurality of programming instructions stored in the memory and when executed by the processor cause the processor to:
      receive, from a facilitator user device, a request to assign a plurality of user devices to one or more groups;
      receive, from the facilitator user device, parameters;
      receive, from a database, user information associated with each device of the plurality of user devices, the information comprising at least, attributes associated with a corresponding user device of the plurality of user devices;
      receive one or more thought objects shared by the plurality of user devices;
      assign one or more user devices to a first group, of a plurality of groups, the first group associated with one or more subjects associated with at least a portion of the one or more thought objects wherein the plurality of groups is based on the parameters; and
      send details of the first group to a graphical user interface associated with one or more user devices, of the plurality of user devices, the details comprising information associated with the first group;
   wherein to assign one or more user devices to a subject, the plurality of programming instructions when further executed by the processor cause the processor to:
      until no user devices remain in the plurality of user devices:
         randomly select at least a portion of user devices, of the plurality of user devices;
         calculate a first utility of assignment, of a plurality of utility assignments, the first utility of assignment associated with a first user device, of the at least portion of user devices, and a first subject, of the one or more subjects;
         select at least one subject, from the one or more subjects, the at least one subject having a highest utility of assignment of the plurality of utility assignments;
         if the at least one subject comprises only one subject, set the only one subject as a highest subject;
         otherwise:
            for each subject of the at least one subject, calculate a tiebreaker score of a plurality of tiebreaker scores;
            select a tiebroken subject as a highest subject, the tiebroken subject having the highest tiebreaker score of the plurality of tiebreaker scores;
         associate the first user devices with the highest subject;
         remove the first user devices from the plurality of user devices.

2. The system of claim 1, wherein the tiebreaker score is associated with:
a strategy setting received from the facilitator device; and
an average rating for the one or more subjects.

3. The system of claim 1, wherein the utility of assignment is associated with a rating received from the first user device, the rating associated with at least one thought object of the of the one or more thought objects.

4. The system of claim 3, wherein to assign one or more user devices to a group, the plurality of programming instructions when further executed by the processor cause the processor to:
receive a plurality of participant devices assigned to a subject, of the one or more subjects, the plurality of participant devices being at least a portion of the plurality of user devices;
remove empty subjects, from the one or more subjects, the empty subjects associated with no user devices, of the plurality of user devices; and
reassign user devices by executing a reassociation process.

5. The system of claim 4, wherein to execute the reassociation process, the plurality of programming instructions when further executed by the processor cause the processor to:
receive a minimum number of participant devices per group, a maximum number of participant devices per group, and a maximum group quantity from the facilitator device;
until no subjects remain of the one or more subjects with fewer than the minimum number of participant devices assigned:
split the plurality of participant devices assigned to a first subject, of the one or more subjects, substantially evenly into one or more assigned groups wherein the number of participant devices in each group of the one or more assigned groups comprises a quantity of participant devices greater than or equal to the minimum number of participant devices and, if possible, less than or equal to the maximum number of participant devices;
add the first group to a collection of groups;
upon the quantity of groups of the collection of groups being less than or equal to than the maximum group quantity and one or more of the one or more subjects having fewer than the minimum number of participant devices assigned:
select a low quantity subject with a fewest quantity of assigned participant devices wherein if more than one low quantity subjects result, selecting the low quantity subject from the more than one low quantity subject at random;
select a first participant device associated with the low quantity subject;
calculate a decrease in a utility of assignment for the first participant device for each subject of a remaining one or more subjects;
select one or more high utility subjects of the remaining one or more subjects, the one or more high utility subjects having the least decrease in the utility of assignment;
if the one or more high utility subjects comprises only one subject, then reassociating the first participant device with the only one subject;
otherwise:
for each subject of the one or more high utility subject, calculate a utility tiebreaker score of a plurality of utility tiebreaker scores;
select a tiebroken utility subject, the tiebroken high utility subject having the highest tiebreaker score of the plurality of tiebreaker scores;
reassociate the first participant devices with the tiebroken high utility subject;
if one or more participant devices remain associated with the low quantity subject, repeat the participant device reassociation process for a next device associated with the low quantity subject;
upon the low quantity subject having no associated participant devices, removing the low quantity subject from the plurality of subjects.

6. The system of claim 3, wherein to assign one or more user devices to a group, the plurality of programming instructions when further executed by the processor cause the processor to:
receive a plurality of participant devices assigned to the one or more subjects, the plurality of participant devices being at least a portion of the plurality of user devices;
if the parameters comprise a number of groups and does not comprise a minimum number of devices per group and a maximum number of devices per group, then set an appropriate number for the minimum number of devices per group and an appropriate number the maximum number of devices per group;
remove empty subjects, from the one or more subjects, the empty subjects associated with no participant devices, of the plurality of user devices;
upon one or more of the one or more subjects are associated with a number of participant devices less than the value of the minimum number of participant devices per group:
perform an iterative reassignment of participant devices from one or more of the one or more subjects, associated with the fewest participant devices, to others of the one or more subjects, resulting in the least decrease in the utility of assignment; and,
wherein the decrease in the utility of assignment is tied, the highest tiebreaker score;
upon one or more of the one or more subjects are associated with a number of participant devices determined to prevent the subject from being split into groups:
perform an iterative reassignment of participant devices from one or more of the one or more subjects to others of the one or more subjects, resulting in the greatest decrease in the minimum number of reassignments determined to allow the respective subjects to be split into groups;
wherein the decrease in the minimum number of reassignments is tied, the least decrease in the utility of assignment; and,
wherein the decrease in the utility of assignment is tied, the highest tiebreaker score for the subject to which the participant device is reassigned;
create one or more groups from each of the one or more subjects, wherein the number of participant devices associated with each group is substantially greater than or equal to the value of minimum number of devices per group and substantially less than the value of maximum number of devices per group, by iteratively performing the assignment of a participant device associated with the subject to one of the groups associated with the fewest participant devices, with the highest utility of assignment;

assign at least a portion of the assignable participant devices to at least a portion of the one or more groups.

7. The system of claim 1, wherein prior to randomly select at least a portion of user devices, of the plurality of user devices, remove one or more blocked subjects, of the one or more subjects.

8. The system of claim 1, wherein prior to randomly select at least a portion of user devices, of the plurality of user devices, remove one or more user devices, from the plurality of user devices, previously assigned to one or more groups of the plurality of groups.

9. The system of claim 8, wherein prior to remove one or more user devices, from the plurality of user devices, previously assigned to one or more groups of the plurality of groups, remove one or more user devices, from the plurality of user devices, previously assigned to one or more groups of the plurality of groups.

10. A computer-implemented method for grouping a plurality of user devices, the method comprising the steps of:
receiving, by a device grouping computer from a facilitator user device, a request to assign a plurality of user devices to one or more groups;
receiving, by the device grouping computer from the facilitator user device, parameters;
receiving, by a device grouping computer from a database, user information associated with each device of the plurality of user devices, the information comprising at least, attributes associated with a corresponding user device of the plurality of user devices;
receiving, by the device grouping computer, one or more thought objects shared by the plurality of user devices; and
assigning, by the device grouping computer, one or more user devices to a first group, of a plurality of groups, the first group associated with one or more subjects associated with at least a portion of the one or more thought objects wherein the plurality of groups is based on the parameters; and
sending, by the device grouping computer, details of the first group to a graphical user interface associated with one or more user devices, of the plurality of user devices, the details comprising information associated with the first group;
wherein assigning, by the device grouping computer, the one or more user devices to a subject, further comprises the steps of:
until no user devices remain in the plurality of user devices:
randomly selecting, by the device grouping computer, at least a portion of user devices, of the plurality of user devices;
calculating, by the device grouping computer, a first utility of assignment, of a plurality of utility assignments, the first utility of assignment associated with a first user device, of the at least portion of user devices, and a first subject, of the one or more subjects;
selecting, by the device grouping computer, at least one subject, from the one or more subjects, the at least one subject having a highest utility of assignment of the plurality of utility assignments;

if the at least one subject comprises only one subject, setting, by the device grouping computer, the only one subject as a highest subject;
otherwise:
for each subject of the at least one subject, calculating, by the device grouping computer, a tiebreaker score of a plurality of tiebreaker scores;
selecting, by the device grouping computer, a tiebroken subject as a highest subject, the tiebroken subject having the highest tiebreaker score of the plurality of tiebreaker scores;
associating, by the device grouping computer, the first user devices with the highest subject;
removing, by the device grouping computer, the first user devices from the plurality of user devices.

11. The method of claim 10, wherein the tiebreaker score is associated with:
a strategy setting received from the facilitator device; and
an average rating for the one or more subjects.

12. The method of claim 10, wherein the utility of assignment is associated with a rating received, by the device grouping computer from the first user device, the rating associated with at least one thought object of the of the one or more thought objects.

13. The method of claim 12, wherein assigning, by the device grouping computer, one or more user devices to a group, further comprises the steps of:
receiving, by the device grouping computer, a plurality of participant devices assigned to a subject, of the one or more subjects, the plurality of participant devices being at least a portion of the plurality of user devices;
removing, by the device grouping computer, empty subjects, from the one or more subjects, the empty subjects associated with no user devices, of the plurality of user devices; and
reassigning, by the device grouping computer user devices by executing a reassociation process.

14. The method of claim 13, wherein the reassociation process comprises:
receiving, by the device grouping computer, a minimum number of participant devices per group, a maximum number of participant devices per group, and a maximum group quantity from the facilitator device;
until no subjects remain of the one or more subjects with fewer than the minimum number of participant devices assigned:
splitting, by the device grouping computer, the plurality of participant devices assigned to a first subject, of the one or more subjects, substantially evenly into one or more assigned groups wherein the number of participant devices in each group of the one or more assigned groups comprises a quantity of participant devices greater than or equal to the minimum number of participant devices and, if possible, less than or equal to the maximum number of participant devices;
adding, by the device grouping computer, the first group to a collection of groups;
upon the quantity of groups of the collection of groups being less than or equal to than the maximum group quantity and one or more of the one or more subjects having fewer than the minimum number of participant devices assigned:
selecting, by the device grouping computer, a low quantity subject with a fewest quantity of assigned participant devices wherein if more than one low quantity subjects result, selecting the low quantity subject from the more than one low quantity subject at random;

selecting, by the device grouping computer, a first participant device associated with the low quantity subject;

calculating, by the device grouping computer, a decrease in a utility of assignment for the first participant device for each subject of a remaining one or more subjects;

selecting, by the device grouping computer, one or more high utility subjects of the remaining one or more subjects, the one or more high utility subjects having the least decrease in the utility of assignment;

if the one or more high utility subjects comprises only one subject, then reassociating, by the device grouping computer, the first participant device with the only one subject;

otherwise:

for each subject of the one or more high utility subject, calculating, by the device grouping computer, a utility tiebreaker score of a plurality of utility tiebreaker scores;

selecting, by the device grouping computer, a tiebroken utility subject, the tiebroken high utility subject having the highest tiebreaker score of the plurality of tiebreaker scores;

reassociating, by the device grouping computer, the first participant devices with the tiebroken high utility subject;

if one or more participant devices remain associated with the low quantity subject, repeating, by the device grouping computer, the participant device reassociation process for a next device associated with the low quantity subject;

upon the low quantity subject having no associated participant devices, removing, by the device grouping computer, the low quantity subject from the plurality of subjects.

15. The method of claim 12, wherein assigning, by the device grouping computer, one or more user devices to a group comprises:

receiving, by the device grouping computer, a plurality of participant devices assigned to the one or more subjects, the plurality of participant devices being at least a portion of the plurality of user devices;

if the parameters comprise a number of groups and does not comprise a minimum number of devices per group and a maximum number of devices per group, then setting, by the device grouping computer, an appropriate number for the minimum number of devices per group and an appropriate number the maximum number of devices per group;

removing, by the device grouping computer, empty subjects, from the one or more subjects, the empty subjects associated with no participant devices, of the plurality of user devices;

upon one or more of the one or more subjects are associated with a number of participant devices less than the value of the minimum number of participant devices per group:

performing, by the device grouping computer, an iterative reassignment of participant devices from one or more of the one or more subjects, associated with the fewest participant devices, to others of the one or more subjects, resulting in the least decrease in the utility of assignment; and, wherein the decrease in the utility of assignment is tied, the highest tiebreaker score;

upon one or more of the one or more subjects are associated with a number of participant devices determined to prevent the subject from being split into groups:

performing, by the device grouping computer, an iterative reassignment of participant devices from one or more of the one or more subjects to others of the one or more subjects, resulting in the greatest decrease in the minimum number of reassignments determined to allow the respective subjects to be split into groups;

wherein the decrease in the minimum number of reassignments is tied, the least decrease in the utility of assignment; and, wherein the decrease in the utility of assignment is tied, the highest tiebreaker score for the subject to which the participant device is reassigned;

creating, by the device grouping computer, one or more groups from each of the one or more subjects, wherein the number of participant devices associated with each group is substantially greater than or equal to the value of minimum number of devices per group and substantially less than the value of maximum number of devices per group, by iteratively performing the assignment of a participant device associated with the subject to one of the groups associated with the fewest participant devices, with the highest utility of assignment;

assigning, by the device grouping computer, at least a portion of the assignable participant devices to at least a portion of the one or more groups.

16. The method of claim 10, wherein prior to the step of randomly selecting, by the device grouping computer, at least a portion of user devices, of the plurality of user devices, removing, by the device grouping computer, one or more blocked subjects of the one or more subjects.

17. The method of claim 10, wherein prior to the step of randomly selecting, by the device grouping computer, at least a portion of user devices, of the plurality of user devices, removing, by the device grouping computer, one or more user devices, from the plurality of user devices, previously assigned to one or more groups of the plurality of groups.

18. The method of claim 17, wherein prior to the step of removing, by the device grouping computer, one or more user devices, from the plurality of user devices, previously assigned to one or more groups of the plurality of groups, further removing, by the device grouping computer, one or more blocked subjects of the one or more subjects.

* * * * *